US012573657B2

(12) United States Patent
Funada et al.

(10) Patent No.: US 12,573,657 B2
(45) Date of Patent: Mar. 10, 2026

(54) SOLID-STATE BATTERY

(71) Applicant: Murata Manufacturing Co., Ltd., Nagaokakyo (JP)

(72) Inventors: Yusuke Funada, Nagaokakyo (JP); Keisuke Shimizu, Nagaokakyo (JP); Kiyoshi Kumagae, Nagaokakyo (JP); Koichi Nakano, Nagaokakyo (JP); Nobuyuki Iwane, Nagaokakyo (JP); Sumito Shiina, Nagaokakyo (JP); Katsunori Takahara, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 909 days.

(21) Appl. No.: 17/522,428

(22) Filed: Nov. 9, 2021

(65) Prior Publication Data

US 2022/0069347 A1     Mar. 3, 2022

Related U.S. Application Data

(63) Continuation of application No. PCT/JP2020/023045, filed on Jun. 11, 2020.

(30) Foreign Application Priority Data

Jun. 13, 2019     (JP) ................................. 2019-110492

(51) Int. Cl.
H01M 10/0562     (2010.01)
H01M 4/131     (2010.01)
(Continued)

(52) U.S. Cl.
CPC ....... H01M 10/0562 (2013.01); H01M 4/131 (2013.01); H01M 4/133 (2013.01);
(Continued)

(58) Field of Classification Search
CPC ................................................. H01M 10/0562
See application file for complete search history.

(56) References Cited

U.S. PATENT DOCUMENTS 8,323,829 B2     12/2012 Nakamura
8,530,083 B2     9/2013 Nakamura
(Continued)

FOREIGN PATENT DOCUMENTS

CN     109565076 A     4/2019
JP     2004296709 A     10/2004
(Continued)

OTHER PUBLICATIONS

International Search Report issued in PCT/JP2020/023045, dated Aug. 11, 2020.
(Continued)

*Primary Examiner* — Nathanael T Zemui
(74) *Attorney, Agent, or Firm* — ArentFox Schiff LLP

(57)     ABSTRACT

A solid-state battery including a solid-state battery laminated body including a positive electrode layer, a negative electrode layer, and a solid electrolyte interposed between the positive electrode layer and the negative electrode layer; a positive electrode terminal on a first side surface of the solid-state battery laminated body; and a negative electrode terminal on a second side surface of the solid-state battery laminated body, the second side surface facing the first side surface. In such a solid-state battery, in at least one electrode layer of the positive electrode layer and the negative electrode layer, a terminal contact end portion containing an electrode active material is in direct contact with the respective positive or negative electrode terminal, and a thickness of a non-terminal contact end portion in the electrode layer is smaller than a thickness of a central portion of the electrode layer.

21 Claims, 9 Drawing Sheets

(51) Int. Cl.

| | |
|---|---|
| *H01M 4/133* | (2010.01) |
| *H01M 4/134* | (2010.01) |
| *H01M 10/0585* | (2010.01) |
| *H01M 4/02* | (2006.01) |
| *H01M 10/0525* | (2010.01) |

(52) U.S. Cl.

CPC ....... *H01M 4/134* (2013.01); *H01M 10/0585* (2013.01); *H01M 2004/021* (2013.01); *H01M 10/0525* (2013.01); *H01M 2220/20* (2013.01)

(56) References Cited

U.S. PATENT DOCUMENTS

| | | | |
|---|---|---|---|
| 9,905,364 | B2 | 2/2018 | Hirao |
| 11,165,095 | B2 | 11/2021 | Shimizu et al. |
| 2004/0190221 | A1 | 9/2004 | Yamaguchi et al. |
| 2009/0191461 | A1 | 7/2009 | Nakamura |
| 2012/0196180 | A1 | 8/2012 | Nakamura |
| 2014/0080006 | A1* | 3/2014 | Ogasa ............... H01M 10/0525 |
| | | | 429/322 |
| 2016/0020029 | A1 | 1/2016 | Hirao |

| | | | | |
|---|---|---|---|---|
| 2017/0309968 | A1* | 10/2017 | Komori | ................. H01M 10/48 |
| 2019/0296289 | A1* | 9/2019 | Yamamoto | ............ H01M 50/55 |
| 2020/0014070 | A1 | 1/2020 | Oishi et al. | |
| 2020/0020974 | A1 | 1/2020 | Shimizu et al. | |
| 2020/0328428 | A1* | 10/2020 | Ohta | ..................... H01M 4/661 |
| 2021/0280843 | A1* | 9/2021 | Sugiyo | ................. H01M 4/049 |

FOREIGN PATENT DOCUMENTS

| | | |
|---|---|---|
| JP | 2008078109 A | 4/2008 |
| JP | 2014-116136 A | 6/2014 |
| JP | 2014127463 A | 7/2014 |
| JP | 2015026563 A | 2/2015 |
| JP | 2015-050153 A | 3/2015 |
| JP | 2015069842 A | 4/2015 |
| JP | 2016207540 A | 12/2016 |
| WO | 2014104061 A1 | 7/2014 |
| WO | 2018203474 A1 | 11/2018 |

OTHER PUBLICATIONS

Written Opinion of the International Search Report issued in PCT/JP2020/023045, dated Aug. 11, 2020.

* cited by examiner

FIG. 9 – PRIOR ART
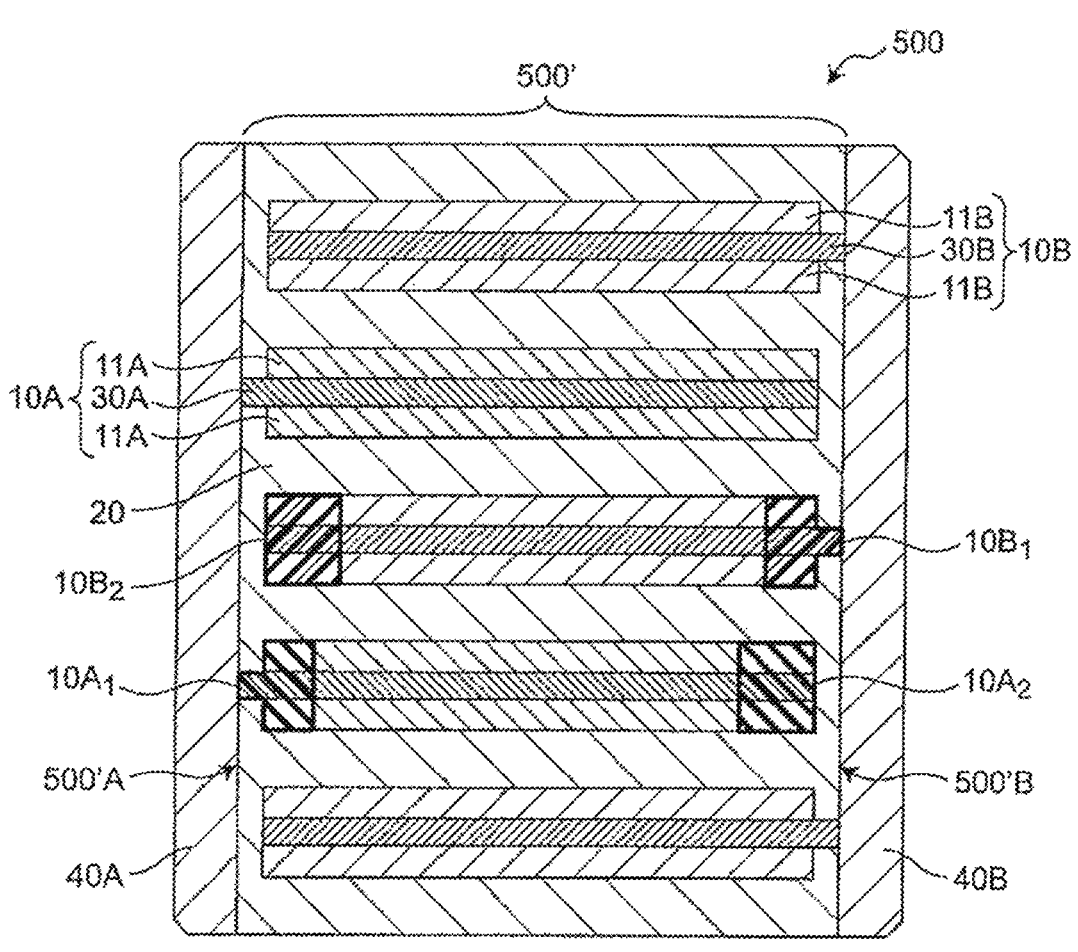

SOLID-STATE BATTERY

CROSS REFERENCE TO RELATED APPLICATIONS

The present application is a continuation of International application No. PCT/JP2020/023045, filed Jun. 11, 2020, which claims priority to Japanese Patent Application No. 2019-110492, filed Jun. 13, 2019, the entire contents of each of which are incorporated herein by reference.

FIELD OF THE INVENTION

The present invention relates to a solid-state battery. More specifically, the present invention relates to a laminated type solid-state battery.

BACKGROUND OF THE INVENTION

Secondary batteries which can be repeatedly charged and discharged have been used for various applications. For example, secondary batteries are used as a power source of electronic devices such as smartphones and notebook computers.

In a secondary battery, a liquid electrolyte (an electrolytic solution) is commonly used as a medium for ion transfer which contributes to charge and discharge.

However, in such a secondary battery, safety is commonly required from the viewpoint of preventing leakage of the electrolytic solution. In addition, because an organic solvent and the like used for the electrolytic solution are flammable substances, safety is required in that respect as well.

Accordingly, a solid-state battery using a solid electrolyte instead of an electrolytic solution has been studied.

Patent Document 1: Japanese Patent Application Laid-Open No. 2015-69842

SUMMARY OF THE INVENTION

A solid-state battery includes a solid-state battery laminated body including a positive electrode layer, a negative electrode layer, and a solid electrolyte between them (see Patent Document 1). For example, as shown in FIG. 9, in a solid-state battery laminated body 500', a positive electrode layer 10A and a negative electrode layer 10B are laminated with a solid electrolyte 20 interposed therebetween. The positive electrode layer 10A includes a positive electrode sub active material layer 11A and a positive electrode sub current collecting layer 30A formed of a metal material, and the negative electrode layer 10B includes a negative electrode sub active material layer 11B and a negative electrode sub current collecting layer 30B formed of a metal material.

The solid-state battery laminated body 500' is provided with external terminals on two facing side surfaces thereof. That is, the solid-state battery laminated body 500' has a positive-electrode-side end surface 500'A and a negative-electrode-side end surface 500'B facing each other.

The positive electrode layer 10A and the negative electrode layer 10B extend such that they terminate at the positive-electrode-side end surface 500'A and the negative-electrode-side end surface 500'B, respectively. In other words, the positive electrode layer 10A and the negative electrode layer 10B are in direct contact with a positive electrode terminal 40A and a negative electrode terminal 40B, respectively. More specifically, the sub current collecting layers 30A and 30B extending to terminal contact end portions $10A_1$ and $10B_1$ for the positive electrode layer 10A and the negative electrode layer 10B are in direct contact with the positive electrode terminal 40A and the negative electrode terminal 40B, respectively.

The inventors of the present application have noticed that conventional solid-state batteries still have problems to be overcome, and have found the need to take measures therefor. Specifically, the inventors of the present application have found that there is a problem described below.

Charge-discharge reaction of the solid-state battery may be caused by conduction of ions between the positive electrode active material and the negative electrode active material via the solid electrolyte. That is, the charge-discharge reaction amount of the portions facing each other in each electrode layer adjacent to each other in the electrode laminated direction may change according to the active material amount of the portions. In this regard, the inventors of the present application have found that not only the active material in the directly facing portions in each electrode layer but also the active material in the vicinity of the portions (that is, substantially facing portions) may greatly contribute to charge-discharge reaction.

Referring to FIG. 9, for example, because the terminal contact end portion $10B_1$ in the negative electrode layer 10B includes a portion in which only the sub current collecting layer 30B not containing an active material extends, the charge-discharge reaction may decrease, and the volume change may also decrease.

Because the non-terminal contact end portion $10B_2$, which is the other end portion of the negative electrode layer 10B, is substantially facing the portion where only the sub current collecting layer 30A not containing an active material extends at the terminal contact end portion $10A_1$ of the positive electrode layer 10A in the electrode laminated direction, the charge-discharge reaction may decrease, and the volume change may also decrease.

Accordingly, in the electrode layer constituting the solid-state battery laminated body, there may be a difference in volume change amount between a central portion and the end portions (that is, the terminal contact end portion and the non-terminal contact end portion). Therefore, there is a possibility that cracking and/or peeling of the electrode layer may occur due to the stress between the portions where a difference in volume change amount occurs.

The present invention has been made in view of such a problem. That is, a main object of the present invention is to reduce the difference in volume change amount generated in the electrode layer at the time of charge and discharge, thereby providing a solid-state battery capable of reducing cracking and/or peeling of the electrode layer.

The inventors of the present application have tried to solve the above problem by addressing it in a new direction instead of in an extension of the prior art. As a result, the inventors have reached the invention of a solid-state battery in which the above main object is achieved.

According to an aspect of the present invention, there is provided a solid-state battery including a solid-state battery laminated body including a positive electrode layer, a negative electrode layer, and a solid electrolyte interposed between the positive electrode layer and the negative electrode layer; a positive electrode terminal on a first side surface of the solid-state battery laminated body; and a negative electrode terminal on a second side surface of the solid-state battery laminated body, the second side surface facing the first side surface, wherein, at least one of: (1) the positive electrode layer has a terminal contact end portion containing a positive electrode active material in direct contact with the positive electrode terminal, a thickness of a non-terminal contact end portion of the positive electrode layer is smaller than a thickness of a central portion of the positive electrode layer, and (2) the negative electrode layer has a terminal contact end portion containing a negative electrode active material in direct contact with the negative electrode terminal, and a thickness of a non-terminal contact end portion in the negative electrode layer is smaller than a thickness of a central portion of the negative electrode layer.

The solid-state battery according to the present invention can reduce the difference in volume change amount that may occur in the electrode layer at the time of charge and discharge, and can reduce cracking and/or peeling of the electrode layer.

More specifically, in the solid-state battery according to an aspect of the present invention, in at least one of the positive electrode layer or the negative electrode layer, the terminal contact end portion containing an electrode active material is in direct contact with the respective external terminal. This makes it possible to make the electrode active material at the terminal contact end portion contribute to charge-discharge reaction, and make the terminal contact end portion further expand and contract. In the solid-state battery of the present invention, the thickness of the non-terminal contact end portion in at least one electrode layer is smaller than the thickness of the central portion of the electrode layer. This makes it possible, in the electrode layer, to reduce the portion of the non-terminal contact end portion where the expansion amount or the contraction amount may be smaller than that in the central portion of the electrode layer.

Therefore, it is possible to reduce the difference in volume change amount between the central portion and the end portions in the electrode layer constituting the solid-state battery laminated body, and it is possible to suppress cracking and/or peeling in the electrode layer. Therefore, deterioration of battery performance of the solid-state battery can be more suitably prevented, and long-term reliability of the solid-state battery can be improved.

BRIEF EXPLANATION OF THE DRAWINGS

FIG. 9 is a sectional view schematically showing an electrode layer structure of a conventional solid-state battery.

DETAILED DESCRIPTION OF THE INVENTION

Figure 1:
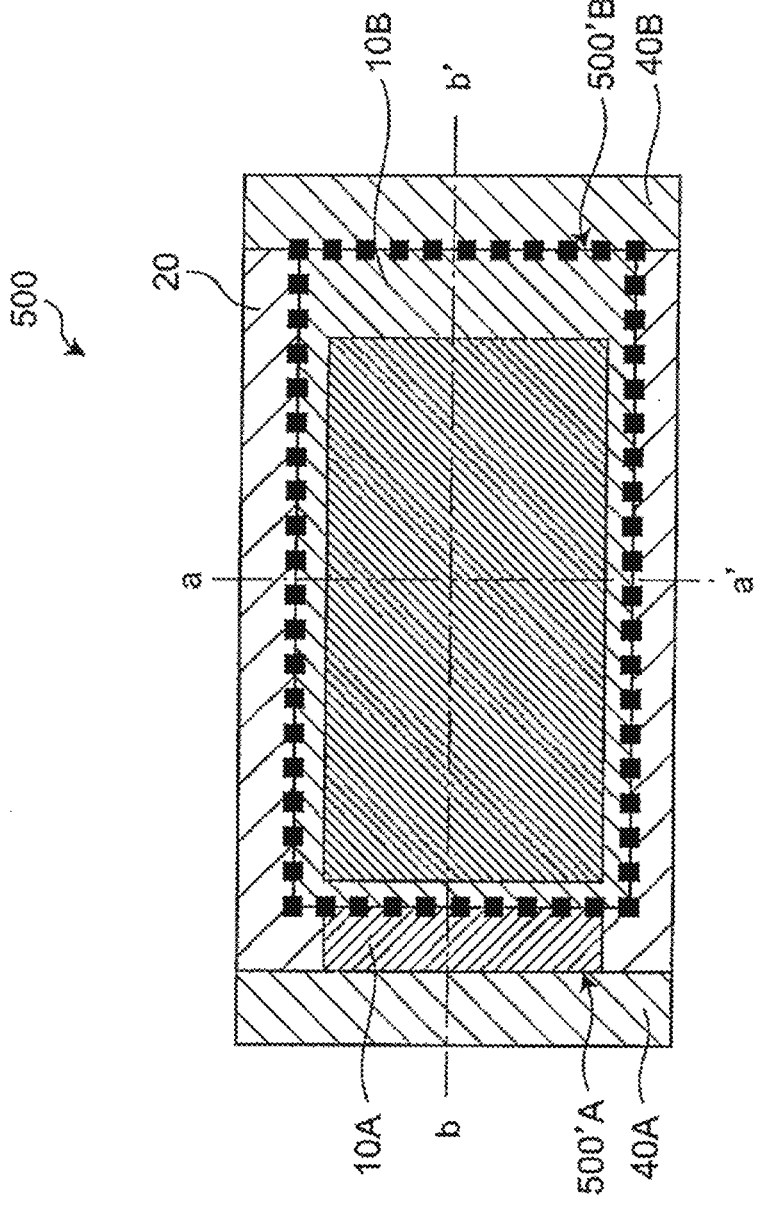
FIG. 1 is a plan view schematically showing a solid-state battery according to one embodiment of the present invention.

Hereinafter, the "solid-state battery" of the present invention will be described in detail. Although the description will be made with reference to the drawings as necessary, the illustrated contents are only schematically and exemplarily illustrated for the understanding of the present invention, and the appearance, the dimensional ratio, and the like may be different from the actual ones.

The term "solid-state battery" in the present invention refers to a battery whose constituent elements are formed of solids in a broad sense, and refers to an all-solid-state battery whose constituent elements (particularly preferably all constituent elements) are formed of solids in a narrow sense. In a preferred aspect, the solid-state battery in the present invention is a laminated type solid-state battery configured such that layers constituting a battery constituent unit are laminated with each other, and preferably such layers are each formed of a sintered body.

The "solid-state battery" encompasses not only a so-called "secondary battery" capable of repeating charge and discharge but also a "primary battery" capable of only discharge. In a preferred aspect of the present invention, the "solid-state battery" is a secondary battery. The "secondary battery" is not excessively limited by its name, and may encompass, for example, an electrochemical device such as a "power storage device".

The term "plan view" in the present specification is based on a form in a case where an object is captured from the upper side or the lower side along the thickness direction based on the laminated direction of the layers constituting the solid-state battery. In short, it is based on the form of the plane of the object shown in FIG. 1 and the like.

The term "sectional view" in the present specification is based on a form in a case where an object is viewed from a direction substantially perpendicular to the thickness direction based on the laminated direction of the layers constituting the solid-state battery. In other words, it is based on the form in the case of cutting the object along a plane parallel to the thickness direction. In short, it is based on the sectional form of the object shown in FIG. 2 and the like.

[Basic Configuration of Solid-State Battery]

The solid-state battery includes a solid-state battery laminated body including a positive electrode layer, a negative electrode layer, and a solid electrolyte interposed between them.

In the solid-state battery, preferably, each layer of the solid-state battery is formed by firing, and the positive electrode layer, the negative electrode layer, the solid electrolyte, and the like may form a sintered body. More preferably, the positive electrode layer, the negative electrode layer, and the solid electrolyte are fired integrally with each other, and therefore the battery constituent unit forms an integrally sintered body.

The positive electrode layer is an electrode layer including at least a positive electrode active material. The positive electrode layer may further include a solid electrolyte and/or a positive electrode sub current collecting layer. In a preferred aspect, the positive electrode layer includes a sintered body including at least a positive electrode sub active material layer containing a positive electrode active material and a solid electrolyte, and a positive electrode sub current collecting layer. In another aspect, the positive electrode layer has a current collecting layer-less structure which does not include the positive electrode sub current collecting layer. That is, the positive electrode layer may include a positive electrode active material without including a current collecting layer as a sublayer, or may include a positive electrode active material and a solid electrolyte without including a current collecting layer.

The negative electrode layer is an electrode layer including at least a negative electrode active material. The negative electrode layer may further include a solid electrolyte and/or a negative electrode sub current collecting layer. In an aspect, the negative electrode layer includes a sintered body including at least a negative electrode sub active material layer containing a negative electrode active material and a solid electrolyte, and a negative electrode sub current collecting layer. In another aspect, the negative electrode layer has a current collecting layer-less structure which does not include the negative electrode sub current collecting layer. That is, the negative electrode layer may include a negative electrode active material without including a current collecting layer as a sublayer, or may include a negative electrode active material and a solid electrolyte without including a current collecting layer.

The positive electrode active material and the negative electrode active material are substances involved in the transfer of electrons in the solid-state battery. Ion movement (conduction) between the positive electrode layer and the negative electrode layer via the solid electrolyte and electron transfer between the positive electrode layer and the negative electrode layer via an external circuit are performed, whereby charge and discharge are made. The positive electrode layer and the negative electrode layer are preferably layers capable of occluding and releasing lithium ions or sodium ions. That is, the solid-state battery is preferably an all-solid-state secondary battery in which lithium ions or sodium ions move between the positive electrode layer and the negative electrode layer via the solid electrolyte, whereby charge and discharge of the battery are made.

(Positive Electrode Active Material)

Examples of the positive electrode active material contained in the positive electrode layer include a lithium-containing compound. The type of the lithium compound is not particularly limited, and examples thereof include a lithium transition metal composite oxide and a lithium transition metal phosphoric acid compound.

The lithium transition metal composite oxide is a generic term for oxides containing lithium and one kind or two or more kinds of transition metal elements as constituent elements, and the lithium transition metal phosphoric acid compound is a generic term for phosphoric acid compounds containing lithium and one kind or two or more kinds of transition metal elements as constituent elements. The kind of the transition metal element is not particularly limited, and examples thereof include cobalt (Co), nickel (Ni), manganese (Mn), and iron (Fe).

Examples of the lithium transition metal composite oxide include a compound represented by each of $Li_xM1O_2$ and $Li_yM2O_4$. Examples of the lithium transition metal phosphoric acid compound include a compound represented by $Li_xM3PO_4$. Here, each of M1, M2, and M3 is one kind or two or more kinds of transition metal elements. Each of x, y, and z takes any value.

Specific examples of the lithium transition metal composite oxide include $LiCoO_2$, $LiNiO_2$, $LiVO_2$, $LiCrO_2$, and/or $LiMn_2O_4$. Specific examples of the lithium transition metal phosphoric acid compound include $LiFePO_4$ and/or $LiCoPO_4$.

In another angle, the positive electrode active material contained in the positive electrode layer may be, for example, at least one selected from the group consisting of a lithium-containing phosphoric acid compound having a NASICON-type structure, a lithium-containing phosphoric acid compound having an olivine-type structure, a lithium-containing layered oxide, a lithium-containing oxide having a spinel-type structure, and the like. Examples of the lithium-containing phosphoric acid compound having a NASICON-type structure include $Li_3V_2(PO_4)_3$. Examples of the lithium-containing phosphoric acid compound having an olivine type structure include $Li_3Fe_2(PO_4)_3$, $LiFePO_4$, and/or $LiMnPO_4$. Examples of the lithium-containing layered oxide include $LiCoO_2$ and $LiCo_{1/3}Ni_{1/3}Mn_{1/3}O_2$. Examples of the lithium-containing oxide having a spinel-type structure include $LiMn_2O_4$ and $LiNi_{0.5}Mn_{1.5}O_4$.

Likewise, the positive electrode active material capable of occluding and releasing sodium ions may be at least one selected from the group consisting of a sodium-containing phosphoric acid compound having a NASICON-type structure, a sodium-containing phosphoric acid compound having an olivine-type structure, a sodium-containing layered oxide, a sodium-containing oxide having a spinel-type structure, and the like.

(Negative Electrode Active Material)

Examples of the negative electrode active material contained in the negative electrode layer include a carbon material, a metal-based material, a lithium alloy, and/or a lithium-containing compound.

Specifically, examples of the carbon material include graphite, graphitizable carbon, non-graphitizable carbon, mesocarbon microbeads (MCMB), and/or highly oriented graphite (HOPG).

The metal-based material is a generic term for materials containing any one kind or two or more kinds among metal elements and semimetal elements capable of forming an alloy with lithium as constituent elements. The metal-based material may be a simple substance, an alloy, or a compound. The purity of the simple substance described here is not necessarily limited to 100%, and the simple substance may contain a trace amount of impurities.

Examples of the metal element and the semimetal element include silicon (Si), tin (Sn), aluminum (Al), indium (In), magnesium (Mg), boron (B), gallium (Ga), germanium (Ge), lead (Pb), bismuth (Bi), cadmium (Cd), titanium (Ti), chromium (Cr), iron (Fe), niobium (Nb), molybdenum (Mo), silver (Ag), zinc (Zn), hafnium (Hf), zirconium (Zr), yttrium (Y), palladium (Pd), and/or platinum (Pt).

Specific examples of the metal-based material include Si, Sn, $SiB_4$, $TiSi_2$, SiC, $Si_3N_4$, $SiO_v$ ($0<v\leq2$), LiSiO, $SnO_w$ ($0<w\leq2$), $SnSiO_3$, LiSnO, and/or $Mg_2Sn$.

Specific examples of the lithium-containing compound include a lithium transition metal composite oxide. The definition of the lithium transition metal composite oxide is as described above. Specific examples of the lithium transition metal composite oxide include $Li_3V_2(PO_4)_3$, $Li_3Fe_2(PO_4)_3$, and/or $Li_4TisO_{12}$.

In another angle, the negative electrode active material contained in the negative electrode layer may be, for example, at least one selected from the group consisting of an oxide containing at least one element selected from the group consisting of Ti, Si, Sn, Cr, Fe, Nb, and Mo, a graphite-lithium compound, a lithium alloy, a lithium-containing phosphoric acid compound having a NASICON-type structure, a lithium-containing phosphoric acid compound having an olivine-type structure, a lithium-containing oxide having a spinel-type structure, and the like. Examples of the lithium alloy include Li—Al. Examples of the lithium-containing phosphoric acid compound having a NASICON-type structure include $Li_3V_2$ $(PO_4)_3$ and/or $LiTi_2(PO_4)_3$. Examples of the lithium-containing phosphoric acid compound having an olivine type structure include $Li_3Fe_2(PO_4)_3$ and/or $LiCuPO_4$. Examples of the lithium-containing oxide having a spinel-type structure include $Li_4TisO_{12}$.

Likewise, the negative electrode active material capable of occluding and releasing sodium ions may be at least one selected from the group consisting of a sodium-containing phosphoric acid compound having a NASICON-type structure, a sodium-containing phosphoric acid compound having an olivine-type structure, a sodium-containing oxide having a spinel-type structure, and the like.

The positive electrode layer and/or the negative electrode layer may contain an electron conductive material. Examples of the electron conductive material contained in the positive electrode layer and/or the negative electrode layer include a carbon material and/or a metal material. Specifically, examples of the carbon material include graphite and/or carbon nanotubes. Examples of the metal material include copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd), and may be an alloy of two or more kinds thereof.

The positive electrode layer and/or the negative electrode layer may contain a binder. Examples of the binder include any one kind or two or more kinds of synthetic rubber, polymer material, and the like. Specifically, examples of the synthetic rubber include styrene-butadiene-based rubber, fluorine-based rubber, and/or ethylene propylene diene. Examples of the polymer material may include at least one selected from the group consisting of polyvinylidene fluoride, polyimide, and acrylic resin.

Further, the positive electrode layer and/or the negative electrode layer may contain a sintering additive. Examples of the sintering additive may include at least one selected from the group consisting of lithium oxide, sodium oxide, potassium oxide, boron oxide, silicon oxide, bismuth oxide, and phosphorous oxide.

The thicknesses of the positive electrode layer and the negative electrode layer are not particularly limited. For example, the thickness of each of the positive electrode layer and the negative electrode layer may be 2 μm to 100 μm, and particularly may be 5 μm to 50 μm.

(Solid Electrolyte)

The solid electrolyte is a material capable of conducting lithium ions or sodium ions. In particular, the solid electrolyte constituting the battery constituent unit in the solid-state battery forms a layer capable of conducting lithium ions between the positive electrode layer and the negative electrode layer. The solid electrolyte may be provided at least between the positive electrode layer and the negative electrode layer. That is, the solid electrolyte may also exist around the positive electrode layer and/or the negative electrode layer such that the solid electrolyte protrudes from between the positive electrode layer and the negative electrode layer. Specific examples of the solid electrolytes include any one kind or two or more kinds of crystalline solid electrolyte, glass ceramic-based solid electrolyte, and the like.

The crystalline solid electrolyte is a crystalline electrolyte. Specifically, examples of the crystalline solid electrolyte include an inorganic material and/or a polymer material, and examples of the inorganic material include a sulfide and/or an oxide. Examples of the sulfide include $Li_2S$—$P_2S_5$, $Li_2S$—$SiS_2$—$Li_3PO_4$, $Li_7P_3S_{11}$, $Li_{3.25}Ge_{0.25}P_{0.75}S$, and/or $Li_{10}GeP_2S_{12}$. Examples of the oxide include $Li_xM_y$ $(PO_4)_3$ (1≤x≤2, 1≤y≤2, and M is at least one selected from the group consisting of Ti, Ge, Al, Ga, and Zr), $Li_7La_3Zr_2O_{12}$, $Li_{6.75}La_3Zr_{1.75}Nb_{0.25}O_{12}$, $Li_6BaLa_2Ta_2O_{12}$, $Li_{1+x}Al_xTi_{2-x}$ $(PO_4)_3$, $La_{2/3-x}Li_{3x}TiO_3$, $Li_{1.2}$ $Al_{0.2}Ti_{1.8}$ $(PO_4)_3$, $La_{0.55}Li_{0.35}$ $TiO_3$, and/or $Li_7La_3Zr_2O_{12}$. Examples of the polymer material include polyethylene oxide (PEO).

The glass ceramic-based solid electrolyte is an electrolyte in which amorphous and crystalline are mixed. The glass ceramic-based solid electrolyte is, for example, an oxide containing lithium (Li), silicon (Si), and/or boron (B) as constituent elements, and more specifically, contains lithium oxide ($Li_2O$), silicon oxide ($SiO_2$), and/or boron oxide ($B_2O_3$), and the like.

The ratio of the content of lithium oxide to the total content of lithium oxide, silicon oxide, and boron oxide is not particularly limited, and is, for example, 40 mol % to 73 mol %. The ratio of the content of silicon oxide to the total content of lithium oxide, silicon oxide, and boron oxide is not particularly limited, and is, for example, 8 mol % to 40 mol %. The ratio of the content of boron oxide to the total content of lithium oxide, silicon oxide, and boron oxide is not particularly limited, and is, for example, 10 mol % to 50 mol %. To measure the content of each of lithium oxide, silicon oxide, and boron oxide, the glass ceramic-based solid electrolyte is analyzed by, for example, inductively coupled plasma atomic emission spectrometry (ICP-AES) or the like.

In another angle, the solid electrolyte may be, for example, a lithium-containing phosphoric acid compound having a NASICON-type structure, an oxide having a perovskite structure, an oxide having a garnet-type or garnet-type similar structure, or the like. Examples of the lithium-containing phosphoric acid compound having a NASICON-type structure include $Li_xM_y$ $(PO_4)_3$ (1≤x≤2, 1≤y≤2, and M is at least one selected from the group consisting of Ti, Ge, Al, Ga, and Zr). Examples of the lithium-containing phosphoric acid compound having a NASICON-type structure include $Li_{1.2}$ $Al_{0.2}$ $Ti_{1.8}$ $(PO_4)_3$. Examples of the oxide having a perovskite structure include $La_{0.55}Li_{0.35}TiO_3$. Examples of the oxide having a garnet-type or garnet-type similar structure include $Li_7La_3Zr_2O_{12}$.

Likewise, the solid electrolyte capable of conducting sodium ions may be, for example, a sodium-containing phosphoric acid compound having a NASICON-type structure, an oxide having a perovskite structure, an oxide having a garnet-type or garnet-type similar structure, or the like. Examples of the sodium-containing phosphoric acid compound having a NASICON-type structure include $Na_xM_y$ $(PO_4)_3$ (1≤x≤2, 1≤y≤2, and M is at least one selected from the group consisting of Ti, Ge, Al, Ga, and Zr).

The solid electrolyte may contain a binder and/or a sintering additive. The binder and/or the sintering additive to be contained in the solid electrolyte may be selected from, for example, materials similar to the binder and/or the sintering additive that may be contained in the positive electrode layer and/or the negative electrode layer described above.

The thickness of the solid electrolyte located between the positive electrode layer and the negative electrode layer is not particularly limited. For example, the thickness of the solid electrolyte may be 1 μm to 15 μm, and particularly may be 1 μm to 5 μm.

(Positive Electrode Sub Current Collecting Layer/Negative Electrode Sub Current Collecting Layer)

The positive electrode layer may include a positive electrode sub current collecting layer as a sublayer thereof. Likewise, the negative electrode layer may also include a negative electrode sub current collecting layer as a sublayer thereof. In such a case, as the positive electrode current collecting material constituting the positive electrode sub current collecting layer and the negative electrode current collecting material constituting the negative electrode sub current collecting layer, it is preferable to use a material having high conductivity, and for example, it is preferable to use at least one selected from the group consisting of a carbon material, silver, palladium, gold, platinum, aluminum, copper, and nickel.

Each of the positive electrode sub current collecting layer and the negative electrode sub current collecting layer may have an electrical connection portion for being electrically connected to the outside, and may be configured to be electrically connectable to the terminal. Each of the positive electrode sub current collecting layer and the negative electrode sub current collecting layer may have a form of a foil. However, from the viewpoint of improving electron conductivity and reducing manufacturing cost by integral sintering, it is preferable that the positive electrode sub current collecting layer and the negative electrode sub current collecting layer have a form of integral sintering.

When the positive electrode sub current collecting layer and the negative electrode sub current collecting layer have the form of a sintered body, for example, the positive electrode sub current collecting layer and the negative electrode sub current collecting layer may be configured as a sintered body containing an electron conductive material, a binder, and/or a sintering additive. The electron conductive material contained in the positive electrode sub current collecting layer and the negative electrode sub current collecting layer may be selected from, for example, materials similar to the electron conductive material that may be contained in the positive electrode layer and/or the negative electrode layer. The binder and/or the sintering additive contained in the positive electrode sub current collecting layer and the negative electrode sub current collecting layer may be selected from, for example, materials similar to the binder and/or the sintering additive that may be contained in the positive electrode layer and/or the negative electrode layer.

The thicknesses of the positive electrode sub current collecting layer and the negative electrode sub current collecting layer are not particularly limited. The thickness of each of the positive electrode sub current collecting layer and the negative electrode sub current collecting layer may be, for example, 1 μm to 10 μm, and particularly may be 1 μm to 5 μm.

(Insulating Material)

Insulating material refers to a material that does not conduct electricity, that is, a material formed of a non-conductive material. The insulating material is not particularly limited, and it may be made of, for example, a glass material and/or a ceramic material.

The insulating material may be formed to electrically insulate the positive electrode layer, the negative electrode layer, and the external terminal, and may be provided at a desired position in the solid-state battery laminated body. For example, the insulating material may be provided so as to be positioned between the positive electrode layer and/or the negative electrode layer and the external terminal.

As the insulating material, for example, a glass material may be selected. The glass material is not particularly limited, and examples thereof may include at least one selected from the group consisting of soda lime glass, potash glass, borate glass, borosilicate glass, barium borosilicate glass, borite glass, barium borate glass, bismuth borosilicate glass, bismuth zinc borate glass, bismuth silicate glass, phosphate glass, aluminophosphate glass, and phosphite glass. The ceramic material is not particularly limited, and example thereof may include at least one selected from the group consisting of aluminum oxide ($Al_2O_3$), boron nitride (BN), silicon dioxide ($SiO_2$), silicon nitride ($Si_3N_4$), zirconium oxide ($ZrO_2$), aluminum nitride (AlN), silicon carbide (SiC), and barium titanate ($BaTiO_3$).

(Protective Layer)

The solid-state battery may be provided with a protective layer. Such a protective layer may be typically formed on an outermost side of the solid-state battery, and is for electrical, physical and/or chemical protection. The material constituting the protective layer is preferably excellent in insulation property, durability, and/or moisture resistance, and environmentally safe. Preferred examples include glass, ceramics, a thermosetting resin, and/or a photocurable resin.

(External Terminal)

The solid-state battery is typically provided with an external terminal. In particular, a positive electrode terminal and a negative electrode terminal are respectively provided on facing side surfaces of the solid-state battery laminated body. That is, the terminals of the positive and negative electrodes are provided to form a pair on the side surfaces of the solid-state battery. More specifically, the terminal on the positive electrode side connected to the positive electrode layer and the terminal on the negative electrode side connected to the negative electrode layer are provided to form a pair. As such a terminal, it is preferable to use a material having high conductivity. The material of the terminal is not particularly limited, and may be at least one selected from the group consisting of silver, gold, platinum, aluminum, copper, tin, and nickel.

[Characteristic of Solid-State Battery of Present Invention]

The solid-state battery of the present invention has a unique configuration of an electrode layer (that is, at least one electrode layer of the positive electrode layer and the negative electrode layer) of the solid-state battery laminated body.

More specifically, in at least one electrode layer of the solid-state battery laminated body, the terminal contact end portion containing the electrode active material is in direct contact with the external terminal. In addition, the thickness of the non-terminal contact end portion in the electrode layer is smaller than the thickness of the central portion of the electrode layer.

The term "end portion" in the present specification refers to a portion near an edge of the electrode layer. Here, the edge of the electrode layer refers to an outermost edge of the electrode layer, and refers to the outermost outline (dotted line portion in FIG. 1) of the electrode layer in a plan view of the solid-state battery. Specifically, the "end portion" refers to a portion from an edge to 200 μm in the electrode layer.

The term "terminal contact end portion" in the present specification refers to an end portion that is in direct contact with the external terminal in the electrode layer, and the term "non-terminal contact end portion" refers to other end portions (that is, an end portion not in direct contact with the external terminal). The "central portion" refers to a portion other than the "end portion" in the electrode layer.

The "thickness of the end portion" or the "thickness of the central portion" in the present specification refers to an average value of the thickness at the "end portion" or the "central portion" in the electrode layer.

For example, "thickness of the end portion" may be an average value of the thicknesses at two or more points in the range of 0 μm to 200 μm from the edge of the electrode layer. Specifically, it may be an average value of the thickness at an arbitrary position in the range of 0 μm to 50 μm from the edge of the negative electrode layer and the thickness at an arbitrary position in the range of 50 μm to 200 μm from the edge.

In addition, for example, the "thickness of the central portion" may be an average value of the thicknesses at two or more points in a portion in the range of 200 μm to 1 mm from the edge of the electrode layer.

In the solid-state battery of the present invention, in at least one of the electrode layers of the solid-state battery laminated body, the terminal contact end portion containing the electrode active material is in direct contact with the external terminal. More specifically, the terminal contact end portion containing the electrode active material is in direct contact with the external terminal with a portion containing the electrode active material interposed therebetween. As a result, it is possible to make the electrode active material at the terminal contact end portion contribute to charge-discharge reaction, and make the terminal contact end portion of the electrode layer further expand and contract.

In other words, not only the active material portion at portions where are directly facing each other in each electrode layer but also the active material at portions where are substantially facing each other can contribute to charge-discharge reaction, and the battery capacity in the solid-state battery can be increased.

It is considered that the contribution of the end portion of the electrode layer to charge-discharge reaction as described above is caused by driving force that reduces the potential difference between the central portion and the end portion in the electrode layer, though it is not tied by a specific theory. More specifically, it is considered that when the central portion in the electrode layer is charged or discharged, a potential difference is generated between the central portion and the end portion, and charge-discharge reaction proceeds using the potential difference as a driving force.

The thickness of the non-terminal contact end portion in the electrode layer is smaller than the thickness of the central portion of the electrode layer. For example, the ratio of the thickness of the non-terminal contact end portion to the thickness of the central portion in the electrode layer is no more than 0.95. This makes it possible to reduce the portion of the non-terminal contact end portion where the expansion amount or the contraction amount may be smaller than that in the central portion in the electrode layer.

The configuration of the electrode layer described above can make charge-discharge reaction in the electrode layer more uniform and reduce the difference in volume change amount between the central portion and the end portions of the electrode layer. In other words, in each electrode layer having the above configuration, the volume change amount can be made more uniform in charge and discharge, and thus cracking and/or peeling in the electrode layer can be suppressed.

Because the terminal contact end portion of the electrode layer in the solid-state battery of the present invention contains an electrode active material that may contribute to charge-discharge reaction particularly at a portion in direct contact with the external terminal, the battery capacity in the solid-state battery can be increased. Therefore, when the thickness of the non-terminal contact end portion is reduced, charge-discharge reaction in the electrode layer can be made more uniform without the battery capacity being reduced (or with the battery capacity being increased).

The non-terminal contact end portion of the electrode layer in the solid-state battery of the present invention is smaller in thickness than the central portion of the electrode layer. This means that the distance between the electrodes can be increased at the end portion where the distance between the electrodes is typically small, and a short circuit caused by contact between the electrode layers due to expansion can be more effectively prevented.

Figure 2:
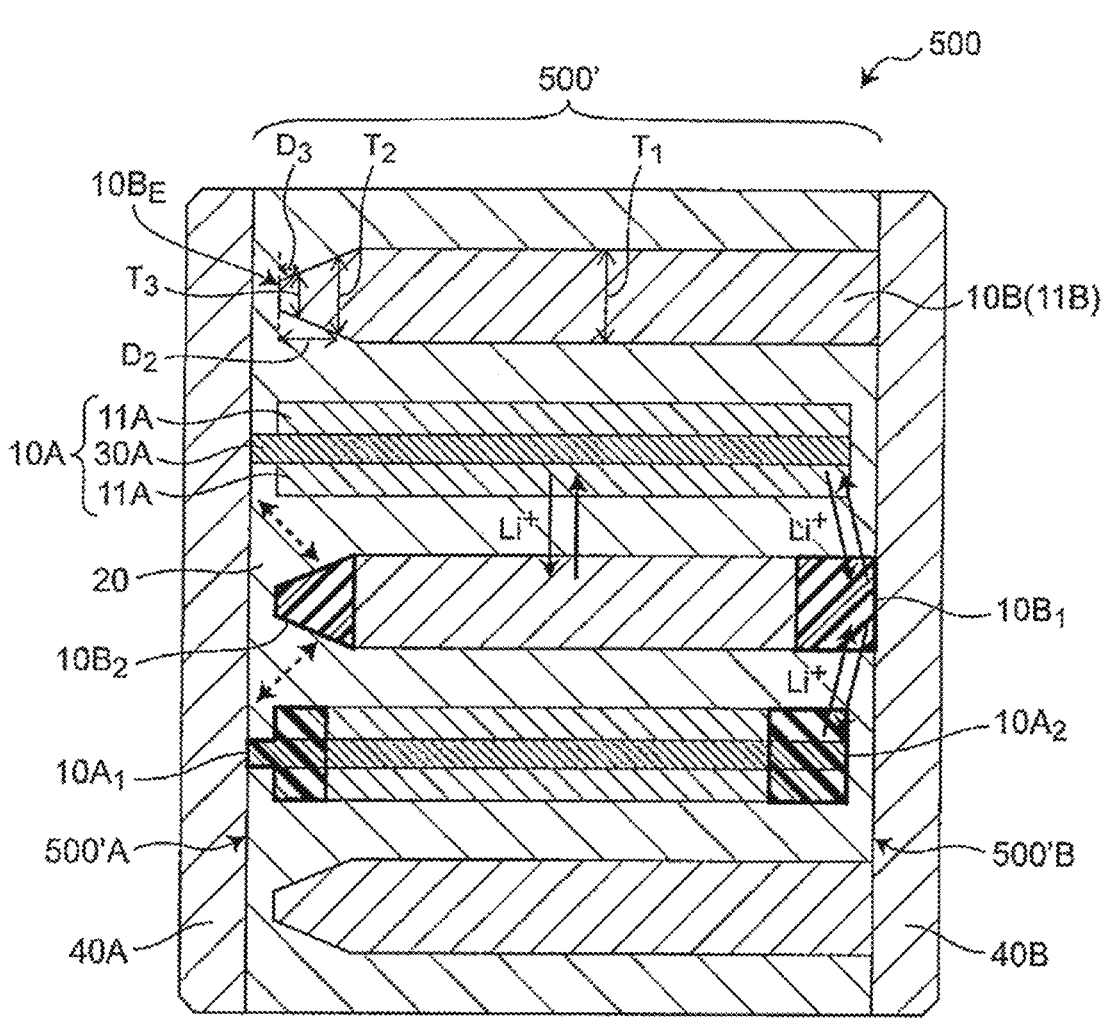
FIG. 2 is a sectional view schematically showing an aspect in which a negative electrode layer has an electrode layer structure of the solid-state battery according to one embodiment of the present invention.

In the exemplary aspect shown in FIG. 2, in a sectional view of the solid-state battery 500 (a cross section taken along a line b-b' in FIG. 1), the terminal contact end portion $10B_1$ of the negative electrode layer 10B containing the negative electrode active material is in direct contact with the external terminal 40B. That is, there is no insulating portion or the like between the terminal contact end portion $10B_1$ and the external terminal 40B. The thickness of the non-terminal contact end portion $10B_2$ of the negative electrode layer 10B is smaller than the thickness of the central portion of the negative electrode layer 10B.

The terminal contact end portion $10B_1$ of the negative electrode layer 10B substantially faces the non-terminal contact end portion $10A_2$ of the positive electrode layer 10A in the electrode laminated direction. That is, in the sectional view of the solid-state battery as shown in FIG. 2, the terminal contact end portion $10B_1$ of the negative electrode layer 10B and the non-terminal contact end portion $10A_2$ of the positive electrode layer 10A face each other at an angle with a slight deviation from the electrode laminated direction. Because the terminal contact end portion $10B_1$ contains the negative electrode active material, ion (for example, lithium ion) conduction occurs between the terminal contact end portion $10B_1$ and the non-terminal contact end portion $10A_2$, and expansion and contraction may occur.

Further, the non-terminal contact end portion $10B_2$ of the negative electrode layer 10B substantially faces the terminal contact end portion $10A_1$ of the positive electrode layer 10A in the electrode laminated direction. That is, in the sectional view of the solid-state battery as shown in FIG. 2, the non-terminal contact end portion $10B_2$ of the negative electrode layer 10B and the terminal contact end portion $10A_1$ of the positive electrode layer 10A face each other at an angle with a slight deviation from the electrode laminated direction. The terminal contact end portion $10A_1$ includes a portion in which only the sub current collecting layer 30A extends as illustrated in the drawing. Therefore, the terminal contact end portion $10A_1$ may have a low active material content in terms of composition and/or a small thickness in terms of structure (that is, the separation distance from the non-terminal contact end portion $10B_2$ may increase).

Here, the non-terminal contact end portion $10B_2$ of the negative electrode layer 10B has a smaller thickness than the central portion. As a result, it is possible to reduce the portion where volume change may be relatively small (that is, a portion where charge-discharge reaction may be reduced) in the non-terminal contact end portion $10B_2$ as compared with the central portion. In addition, it is possible to further increase the separation distance between the non-terminal contact end portion $10B_2$ and the terminal contact end portion $10A_1$, and it is possible to particularly prevent short circuit (for example, slight short circuit) due to contact between the positive electrode layer and the negative electrode layer caused by expansion and contraction that may occur at the electrode layer end portion.

The above-described configuration can make charge-discharge reaction in the negative electrode layer 10B more uniform and make the resulting volume change amount of the negative electrode layer more uniform as well. Therefore, cracking and/or peeling because of such an electrode layer can be suppressed.

Figures 3A, 3B, 3C, 3D, 3E, 3F, 3G, 3H, 3I:
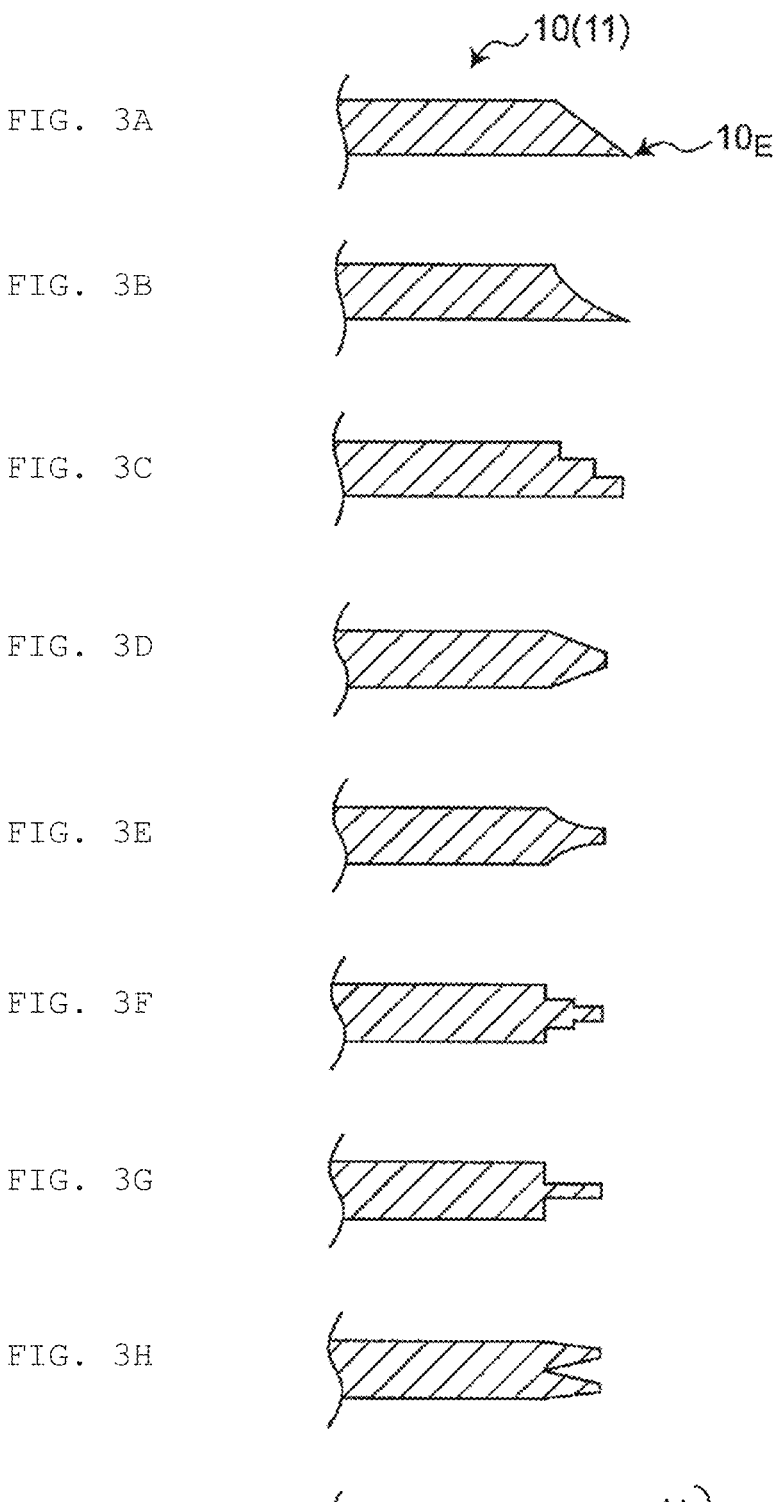
FIGS. 3A to 3I are sectional views schematically showing aspects of an end portion (in particular, a non-terminal contact end portion) of an electrode layer of the solid-state battery according to one embodiment of the present invention.

In a sectional view of the electrode layer 10 including the electrode sub active material layer 11, the thickness of the non-terminal contact end portion in the electrode layer of the present invention may gradually decrease toward the edge $10_E$. That is, in the sectional view of the solid-state battery, the thickness of the non-terminal contact end portion in the electrode layer may gradually decrease toward the edge of the electrode layer. This means that the thickness of the non-terminal contact end portion may gradually decrease toward the outside thereof (for example, as approaching the external terminal that is relatively proximal to the non-terminal contact end portion). The outline (that is, the outline of the solid-state battery in a sectional view) of the non-terminal contact end portion that gradually becomes smaller may have a linear shape (see FIG. 3A), curved shape (see FIG. 3B), or stepwise shape where the outline becomes small stepwise (see FIG. 3C). In the shape of one non-terminal contact end portion, the linear shape and the curved shape may be mixed. The thickness of the non-terminal contact end portion of the electrode layer gradually decreasing like this allows the separation distance with the portion where the electrode active material does not exist (for example, the terminal contact end portion) in adjacent electrode layers in the electrode laminated direction to further increase.

The non-terminal contact end portion may have a shape in which the thickness decreases such that the non-terminal contact end portion is tapered from both sides in the electrode laminated direction toward an edge $10_E$ of the electrode layer 10 (see FIGS. 3D to 3I). That is, in the sectional view as illustrated, the thickness of the non-terminal contact end portion may decrease (for example, decrease gradually or in a stepwise fashion) from both the upper side and the lower side toward the edge $10_E$ of the electrode layer 10. Such a shape can more effectively increase the separation distance with the portion where the electrode active material does not exist in the electrode layers adjacent on both sides in the electrode laminated direction. Therefore, charge-discharge reaction in the electrode layer can be made more uniform. In addition, it becomes particularly easy to prevent occurrence of short circuit due to contact between electrode layers in charge and discharge. Furthermore, the configuration of the solid-state battery in a sectional view can be made substantially symmetrical, and the structural stability can be further enhanced.

The non-terminal contact end portion may be divided into a plurality of sub convex portions in a sectional view of the solid-state battery. In such a case, each of the plurality of sub convex portions may have a shape in which the thickness decreases such that each sub convex portion is tapered toward the edge of the electrode layer 10 (see FIG. 3H). The electrode layer 10 may also have a configuration in which a non-terminal contact end portion tapered toward the edge of the electrode layer, and a sub current collecting layer 40 is interposed between the two electrode sub active material layers 11 (see FIG. 3I).

The shape of the non-terminal contact end portion of the electrode layer as described above may be formed in any cross section of the solid-state battery laminated body. For example, the shape of the non-terminal contact end portion may be formed in a cross section taken along a line a-a' in FIG. 1. Alternatively or in addition, the non-terminal contact end portion of the electrode layer may be formed in a cross section cut along a direction in which the external terminals in a pair are facing each other. In the illustrated exemplary aspect, the shape of the non-terminal contact end portion may be formed in a cross section taken along a line b-b' in FIG. 1.

In one embodiment, in the electrode layer, the ratio of the thickness of the non-terminal contact end portion to the thickness of the central portion is 0.5 to 0.95 at a position of 100 μm from the edge of the electrode layer at the non-terminal contact end portion, and 0.05 to 0.5 at a position of 10 μm from the edge of the electrode layer.

In the exemplified aspect shown in FIG. 2, in the negative electrode layer 10B, the ratio of a thickness ($T_2$) at a position (corresponding to $D_2$) of 100 μm from the negative electrode layer edge $10B_E$ to the thickness ($T_1$) at a central portion is 0.5 to 0.95. When the ratio is no less than 0.5, the battery capacity can be more effectively maintained, and when the ratio is no more than 0.95, the active material amount in a portion where the reaction amount in charge and discharge may be small can be reduced, and the difference in volume change amount in the electrode layer can be particularly reduced. From the viewpoint of making the charge-discharge reaction in the electrode layer uniform, the thickness ratio is preferably 0.6 to 0.9, and for example 0.7 to 0.85. By setting the thickness ratio within such a range, it is possible to make the charge-discharge reaction in the electrode layer more uniform and particularly improve the battery capacity.

In the negative electrode layer 10B, the ratio of the thickness ($T_3$) at a position (corresponding to $D_3$) of 10 μm from the edge $10B_E$ to the thickness ($T_1$) at the central portion is 0.05 to 0.5. When the ratio is no less than 0.05, the battery capacity can be more effectively maintained, and when the ratio is no more than 0.5, the active material amount in a portion where the reaction amount in charge and discharge may be small can be reduced, and the difference in volume change amount in the electrode layer can be particularly reduced. From the viewpoint of making the charge-discharge reaction in the electrode layer uniform, the thickness ratio is preferably 0.1 to 0.4, and for example 0.15 to 0.3. By setting the thickness ratio within such a range, it is possible to make the charge-discharge reaction in the electrode layer more uniform and particularly improve the battery capacity.

In one embodiment, the thickness of the terminal contact end portion in the electrode layer is smaller than the thickness of the central portion of the electrode layer. In the exemplary aspect shown in FIG. 4, in the sectional view of the solid-state battery 500, the thickness of the terminal contact end portion $10B_1$ in the negative electrode layer 10B is smaller than the thickness of the central portion of the negative electrode layer 10B. In the negative electrode layer 10B, by making the thickness of the terminal contact end portion $10B_1$ smaller than the thickness of the central portion, it is possible to reduce the portion where the expansion amount or the contraction amount may be small in the terminal contact end portion as compared with the central portion in the electrode layer.

The shape of the terminal contact end portion may be the same as the shape of the non-terminal contact end portion described above (see FIGS. 3A to 3I). As a result, it is possible to make the charge-discharge reaction in the negative electrode layer 10B more uniform and particularly make the resulting volume change amount more uniform, and thus it is possible to particularly suppress cracking and/or peeling in the electrode layers constituting the solid-state battery laminated body. For example, in a sectional view of the solid-state battery, the terminal contact end portion of the electrode layer may have a shape tapered from both sides in the electrode laminated direction toward an edge of the electrode layer at the terminal contact end portion (see FIGS. 3D to 3I). That is, in the sectional view as illustrated, the thickness of the terminal contact end portion may decrease (for example, decrease gradually or in a stepwise manner) from both the upper side and the lower side toward the edge of the electrode layer. Such a shape can more effectively increase the separation distance with the portion where the electrode active material does not exist in the electrode layers adjacent on both sides in the electrode laminated direction. Therefore, it becomes particularly easy to prevent occurrence of a short circuit due to contact between electrode layers in charge and discharge.

Figure 4:
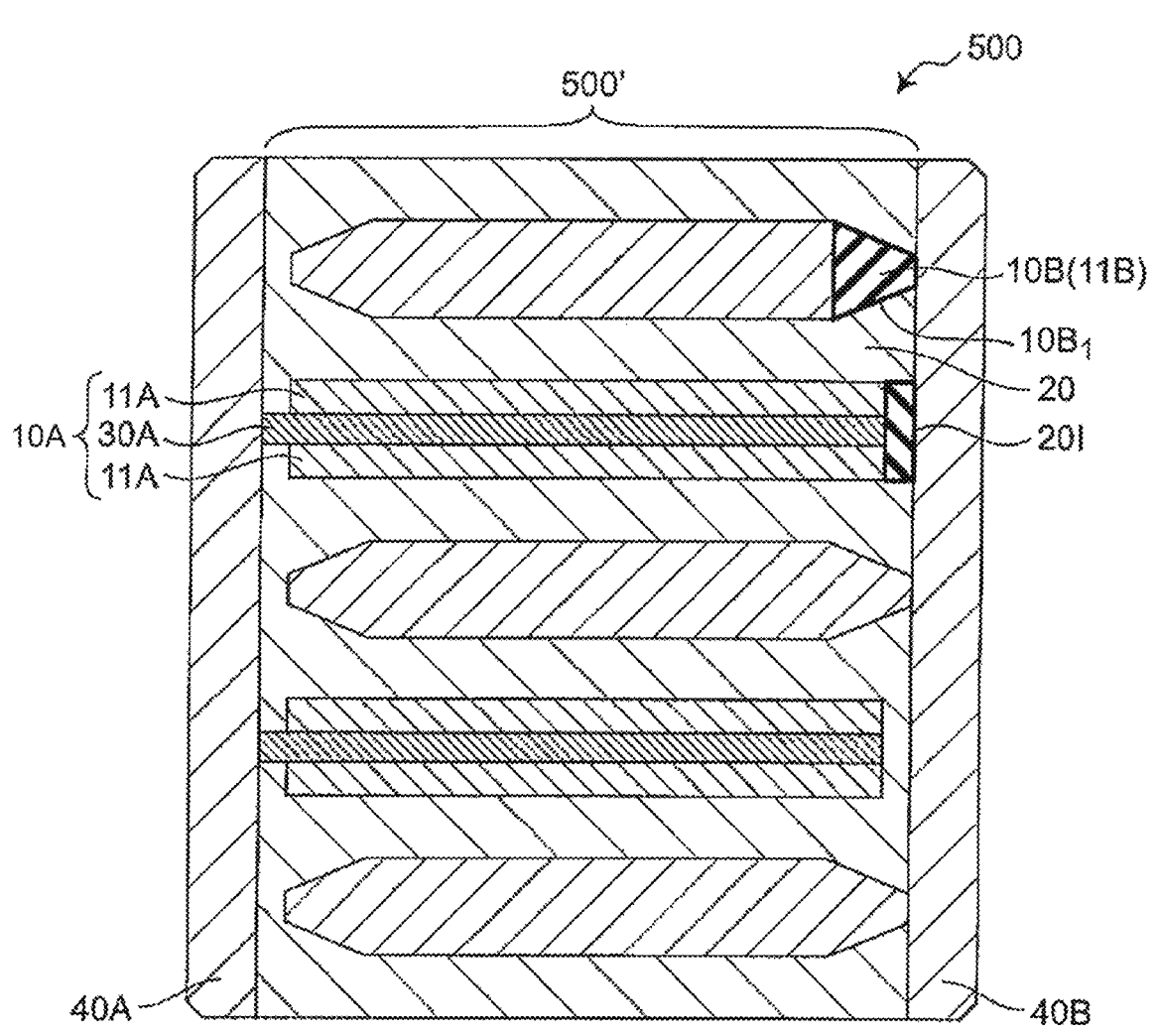
FIG. 4 is a sectional view schematically showing an aspect in which a negative electrode layer has an electrode layer structure of a solid-state battery according to another embodiment of the present invention.

In a preferred aspect, both the terminal contact end portion and the non-terminal contact end portion in the electrode layer may have a gradually tapered shape. That is, in a sectional view of the solid-state battery, both the terminal contact end portion and the non-terminal contact end portion of the electrode layer may have a shape tapered toward the outside of the electrode layer (more specifically, for example, outward in a direction in which the external terminals face each other). When both the terminal contact end portion and the non-terminal contact end portion have a gradually tapered shape as described above, the difference in volume change amount between the central portion and the end portions of the electrode layer in charge-discharge reaction can be more effectively reduced, and cracking and/or peeling in the electrode layer can be more effectively suppressed. As shown in FIG. 4, the terminal contact end portion $10B_1$ of the negative electrode layer 10B faces an insulating portion 20I interposed between the positive electrode layer 10A and the negative electrode terminal 40B in the electrode laminated direction. Because the insulating portion 20I is formed of a solid electrolyte and/or an insulating material, and the contribution to charge-discharge reaction thereof may be small, the terminal contact end portion of the negative electrode layer 10B having a gradually tapered shape may lead to effective use of the electrode active material at the terminal contact end portion.

In one embodiment, in the electrode layer, the ratio of the thickness of the terminal contact end portion to the thickness of the central portion is 0.5 to 0.95 at a position of 100 μm from the edge of the electrode layer at the terminal contact end portion, and 0.05 to 0.5 at a position of 10 μm from the edge of the electrode layer. By setting such a thickness ratio within such a range, in the same way as the thickness ratio of the non-terminal contact end portion described above, it is possible to particularly reduce the difference in volume change amount in the electrode layer while more effectively maintaining (or increasing) the battery capacity.

In one embodiment, a plurality of electrode layers having the terminal contact end portion and the non-terminal contact end portion according to the present invention may be formed. Having a plurality of electrode layers having such end portions makes it easy to make the charge-discharge reaction in the solid-state battery more uniform. For example, the electrode layers having such end portions may be formed in half or more of the number of all the electrode layers, and as one example, the layers may be formed in ¾ or more of the number of all the electrode layers.

In one embodiment, both the positive electrode layer and the negative electrode layer are electrode layers having the terminal contact end portion and the non-terminal contact end portion according to the present invention. Such a configuration can increase the amount of the electrode active material that may contribute to charge-discharge reaction and further increase the battery capacity.

Figure 5A:
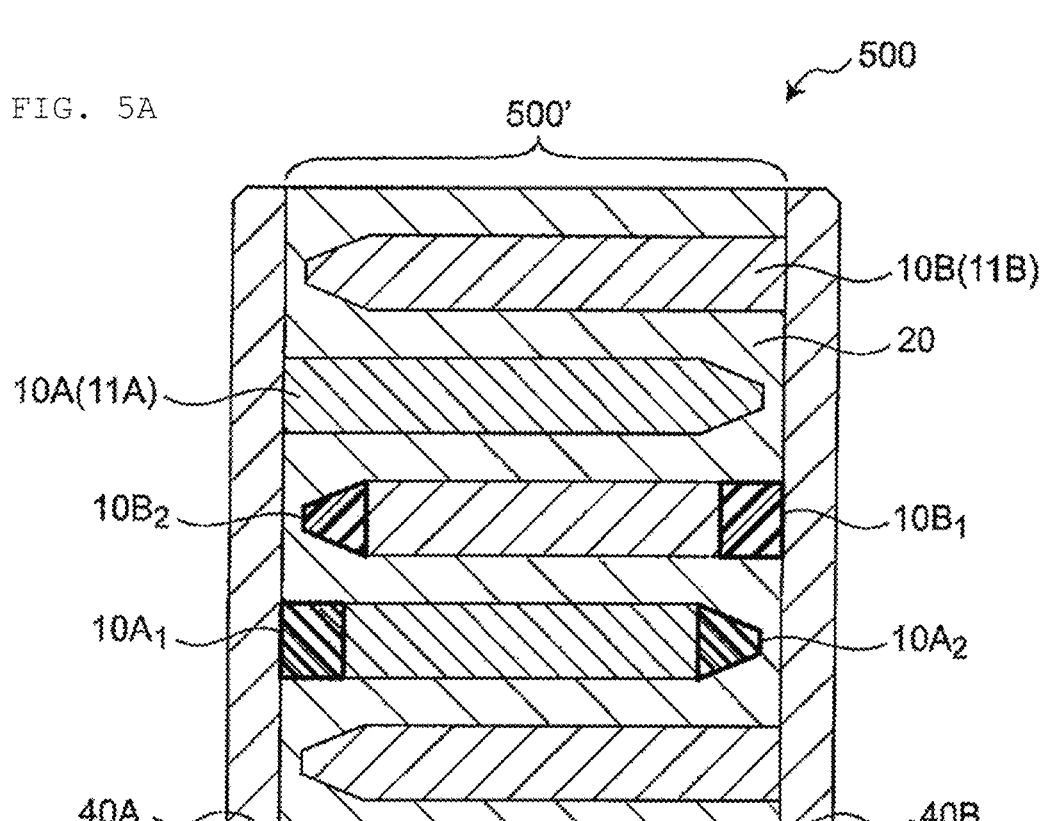
FIGS. 5A and 5B are sectional views schematically showing an aspect in which both a positive electrode layer and a negative electrode layer have the electrode layer structure of the solid-state battery according to one embodiment of the present invention.

In the exemplary aspect shown in FIG. 5A, the terminal contact end portion $10B_1$ containing the negative electrode active material in the negative electrode layer 10B is in direct contact with the external terminal 40B. The thickness of the non-terminal contact end portion $10B_2$ in the negative electrode layer 10B is smaller than the thickness of the central portion of the negative electrode layer 10B.

Likewise, the terminal contact end portion $10A_1$ containing the positive active material in the positive electrode layer 10A is in direct contact with the external terminal 40A. The thickness of the non-terminal contact end portion $10A_2$ in the positive electrode layer 10A is smaller than the thickness of the central portion of the positive electrode layer 10A.

Figure 5B:
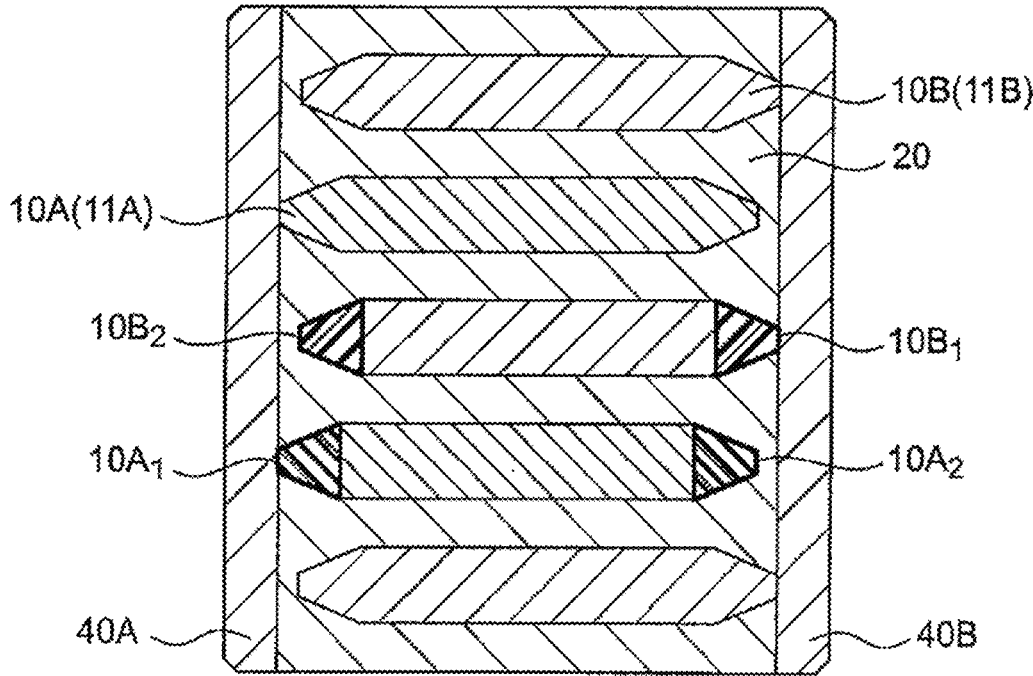

In the above-described aspect, the thickness of the terminal contact end portion in the electrode layer may be smaller than the thickness of the central portion of the electrode layer. In the exemplary aspect shown in FIG. 5B, the thickness of the terminal contact end portion $10B_1$ in the negative electrode layer 10B is smaller than the thickness of the central portion of the negative electrode layer 10B. The thickness of the terminal contact end portion $10A_1$ in the positive electrode layer 10A is also smaller than the thickness of the central portion of the positive electrode layer 10A.

Also in the electrode layer serving as the positive electrode layer, the thickness of the non-terminal contact end portion may gradually decrease. That is, in a sectional view of the solid-state battery, the thickness of the non-terminal contact end portion in the electrode layer serving as the positive electrode layer may gradually decrease toward the edge of the electrode layer. The outline (that is, the outline in a sectional view of the solid-state battery) of the non-terminal contact end portion that gradually decreases in this manner may have a linear shape, curved shape, or stepwise shape where the outline becomes small stepwise. The thickness of the non-terminal contact end portion of the electrode layer gradually decreasing like this allows the separation distance with the portion where the electrode active material does not exist (for example, the terminal contact end portion) in adjacent electrode layers in the electrode laminated direction to effectively increase.

In one embodiment, at least one of the positive electrode layer and the negative electrode layer constituting the solid-state battery laminated body has a current collecting layer-less structure. That is, such an electrode layer may include an electrode active material without including a current collecting layer as a sublayer, or may include an electrode active material and a solid electrolyte without including a current collecting layer. For example, the electrode layer in which the thickness of the non-terminal contact end portion is smaller than the thickness of the central portion may have the current collecting layer-less structure. As a result, the effect of reducing the difference in volume change amount of the electrode layer in charge and discharge may be more remarkable.

In one embodiment, the positive electrode layer and the negative electrode layer are layers capable of occluding and releasing lithium ions, and lithium ions move between the positive electrode layer and the negative electrode layer via the solid electrolyte, whereby charge and discharge of the battery is made. Because such a lithium ion solid-state battery has a large battery capacity, the volume change amount in the electrode layer in charge and discharge may be more non-uniform. In the lithium ion solid-state battery, the shape of the electrode layer according to the present invention makes it easy to suppress cracking, peeling, and the like of the electrode layer in charge and discharge while maintaining a larger battery capacity.

In one embodiment, the negative electrode layer contains at least one selected from the group consisting of graphite, a lithium alloy, and a lithium-containing compound. Containing such a negative electrode active material enables a larger battery capacity.

The structure of the solid-state battery in the present specification may be a structure observed in an image taken with a field emission scanning electron microscope (FE-SEM) (model number S-4800 manufactured by Hitachi High-Tech Corporation) in which a cross section of the electrode layer is exposed by cutting the cross section with an ion milling apparatus (model number IM4000PLUS manufactured by Hitachi High-Tech Corporation) and adjusting the surface by polishing. The shapes of the end portion of the electrode layer referred to in the present specification may be observed from the image acquired by the above-described method. The distance and the thickness at each point in the electrode layer may also be obtained from the image in the same manner.

The solid-state battery according to an aspect of the present invention is a laminated type solid-state battery obtained by laminating layers (materials) constituting the battery, and may be manufactured through a printing method such as a screen printing method, a green sheet method using a green sheet, or a composite method thereof. Therefore, each layer constituting the battery is formed of a sintered body. Preferably, the positive electrode layer, the negative electrode layer, and the solid electrolyte are integrally sintered with each other. That is, it may be said that the solid-state battery laminated body forms a fired integrated product.

In the solid-state battery of an aspect of the present invention, in the fired integrated product as described above, at least one electrode layer has a terminal contact end portion containing an electrode active material, and a non-terminal contact end portion whose thickness is smaller than the thickness of the central portion of the electrode layer.

[Method for Manufacturing Solid-State Battery]

As described above, the solid-state battery of the present invention may be produced by a printing method such as a screen printing method, a green sheet method using a green sheet, or a composite method thereof. Hereinafter, a case where a printing method and a green sheet method are adopted will be described in detail for understanding the present invention, but the present invention is not limited to these methods.

(Step of Forming Solid-State Battery Laminated Body Precursor)

In this step, several types of pastes such as a positive electrode active material layer paste, a negative electrode active material layer paste, a solid electrolyte paste, a current collecting layer paste, an insulating material paste, and a protective layer paste are used as inks. That is, a paste having a predetermined structure is formed on a support base by applying the paste by a printing method.

In printing, a solid-state battery laminated body precursor corresponding to a predetermined solid-state battery structure may be formed on a base by sequentially laminating printing layers with a predetermined thickness and pattern shape. The type of the pattern forming method is not particularly limited as long as it is a method capable of forming a predetermined pattern, and for example, the pattern may be formed using any one kind or two or more kinds of a screen printing method, a gravure printing method, and the like.

The pastes may be prepared by wet-mixing a predetermined constituent material of each layer appropriately selected from the group consisting of a positive electrode active material, a negative electrode active material, an electron conductive material, a solid electrolyte material, a current collecting layer material, an insulating material, a binder, and a sintering additive, with an organic vehicle in which an organic material is dissolved in a solvent. The positive electrode active material layer paste contains, for example, a positive electrode active material, an electron conductive material, a solid electrolyte material, a binder, a sintering additive, an organic material, and a solvent. The negative electrode active material layer paste contains, for example, a negative electrode active material, an electron conductive material, a solid electrolyte material, a binder, a sintering additive, an organic material, and a solvent. The solid electrolyte paste contains, for example, a solid electrolyte material, a binder, a sintering additive, an organic material, and a solvent. The current collecting layer paste contains an electron conductive material, a binder, a sintering additive, an organic material, and a solvent. The protective layer paste contains, for example, an insulating material, a binder, an organic material, and a solvent. The insulating material paste contains, for example, an insulating material, a binder, an organic material, and a solvent.

The organic material contained in the pastes is not particularly limited, and at least one polymer material selected from the group consisting of a polyvinyl acetal resin, a cellulose resin, a polyacrylic resin, a polyurethane resin, a polyvinyl acetate resin, a polyvinyl alcohol resin, and the like may be used. The kind of the solvent is not particularly limited, and is, for example, any one kind or two or more kinds among organic solvents such as butyl acetate, N-methyl-pyrrolidone, toluene, terpineol, and N-methyl-pyrrolidone.

In the wet mixing, a medium may be used, and specifically, a ball mill method, a viscomill method, or the like may be used. A wet mixing method without using a medium may also be used, and a sand mill method, a high-pressure homogenizer method, a kneader dispersion method, or the like may be used.

The support base is not particularly limited as long as it is a support capable of supporting each paste layer, and is, for example, a release film having one surface subjected to a release treatment. Specifically, a base formed of a polymer material such as polyethylene terephthalate may be used. When each paste layer is subjected to a firing step while being held on the base, a base having heat resistance to a firing temperature may be used as the base.

The applied paste is dried on a hot plate heated to no less than 30° C. and no more than 50° C. to form each of a positive electrode layer green sheet, a negative electrode layer green sheet, a solid electrolyte green sheet, an insulating portion green sheet, and/or a protective layer green sheet having a predetermined shape and thickness on a base (for example, a PET film).

Next, each green sheet is peeled off from the base. After the peeling, the green sheets for the respective constituent elements of one battery constituent unit is sequentially laminated along the laminated direction to form a solid-state battery laminated body precursor. After lamination, the side regions of the electrode green sheets may be provided with a solid electrolyte, an insulating portion, and/or a protective layer by screen printing. The constituent elements may be pressure-bonded by heating the obtained solid-state battery laminated body precursor to no less than 80° C. and no more than 150° C. while applying pressure in the thickness direction for example.

(Firing Step)

In the firing step, the solid-state battery laminated body precursor is subjected to firing. Although it is merely an example, the firing is performed by removing the organic material for example at no less than 200° C. and no more than 500° C. in a nitrogen gas atmosphere containing oxygen gas or in the atmosphere, and then heating the solid-state battery laminated body precursor in a nitrogen gas atmosphere or in the atmosphere at no less than 300° C. and no more than 5000° C. for example. The firing may be performed while pressurizing the solid-state battery laminated body precursor in the laminated direction (in some cases, the laminated direction and a direction perpendicular to the laminated direction). The solid-state battery laminated body is formed by going through such firing.

(Step of Forming External Terminal)

A positive electrode terminal is bonded to the solid-state battery laminated body using a conductive adhesive for example, and a negative electrode terminal is bonded to the solid-state battery laminated body using a conductive adhesive for example. As a result, each of the positive electrode terminal and the negative electrode terminal is attached to the solid-state battery laminated body, and thus a solid-state battery is completed.

(Preparation of Characteristic Part in the Present Invention)

The shape of the end portion in which the thickness is smaller than the thickness of the central portion of the electrode layer according to the present invention may be formed by any method as long as the thickness of at least the non-terminal contact end portion is smaller than the thickness of the central portion in a sectional view of the same electrode layer.

As one example, in the screen printing method, the shape may be formed using a screen printing plate in which the mesh diameter applied to the non-terminal contact end portion is smaller than the mesh diameter applied to the central portion of the electrode layer. In a preferred aspect, a screen printing plate with which the mesh diameter decreases gradually or in a stepwise manner toward the edge of the electrode layer is applied to the non-terminal contact end portion to form the shape. As another example, in the printing method, the viscosity of the electrode layer paste may be adjusted such that the film thickness becomes thinner toward the edge of the electrode layer (for example, the paste may be adjusted to have a low viscosity so that the application end flows down).

Furthermore, the end shape in which the thickness of the electrode layer is smaller than that of the central portion may be formed depending on the order of applying the pastes for the electrode layer and the solid electrolyte (or insulating material) in the printing method. As an example, the end shape may be formed by applying an electrode layer paste having a low viscosity to a base layer such that the film thickness of the application end is reduced.

Alternatively, for example, a base layer having a recessed portion having a tapered outline may be formed by applying a solid electrolyte paste having a low viscosity, and such an end shape may be formed by applying an electrolytic layer paste to the recessed portion.

Hereinafter, a method for manufacturing a solid-state battery will be specifically described based on the exemplary aspects shown in FIGS. 6 and 7.

To produce a solid-state battery, as described below for example, a step of forming a positive electrode green sheet, a step of forming a negative electrode green sheet, a step of forming a solid-state battery laminated body, and a step of forming a positive electrode terminal and a negative electrode terminal are performed. In the present exemplary aspect, a description will be given based on a cross section (see FIG. 2) of a solid-state battery having a configuration in which the positive electrode layer includes a positive electrode sub active material layer and a sub current collecting layer, and the negative electrode layer includes only a negative electrode sub active material layer.

(Formation of Positive Electrode Green Sheet)

First, a solid electrolyte paste is prepared by mixing a solid electrolyte, a solvent, and, if necessary, a binder or the like with each other. Subsequently, the solid electrolyte paste is applied to one surface of the substrate 50 to form a solid electrolyte 20 (see FIG. 6A).

Next, on the formed solid electrolyte 20, the solid electrolyte paste or an insulating material paste prepared by mixing an insulating material, a solvent, and, if necessary, a binder and the like with each other is applied such that the solid electrolyte 20 (or the insulating portion) has a recessed shape. At this time, one end portion is thickly applied so as to have the same height as the electrode layer to be applied later, and the other end portion is applied thinner than the one end portion (see FIG. 6B).

Next, a positive electrode active material layer paste is prepared by mixing a positive electrode active material, a solvent, and, if necessary, a binder and the like with each other. Subsequently, the positive electrode active material layer paste is applied to the recessed portion of the solid electrolyte 20 using a pattern forming method, whereby a positive electrode sub active material layer 11A is formed (see FIG. 6C).

Next, a current collecting layer paste is prepared by mixing an electron conductive material, a solvent, and, if necessary, a binder and the like with each other. Subsequently, the current collecting layer paste is applied onto one end portion of the positive electrode sub active material layer 11A and the solid electrolyte 20 (or insulating portion) by using a pattern forming method, whereby a positive electrode sub current collecting layer 30A is formed (see FIG. 6D).

Next, the positive electrode active material layer paste is applied onto the positive electrode sub current collecting layer 30A to form a positive electrode sub active material layer 11A. At this time, the positive electrode sub active material layer 11A is formed such that one end portion of the surface of the positive electrode sub current collecting layer 30A is not coated with the positive electrode active material layer paste, and such an end portion becomes a recessed portion (see FIG. 6E).

Figure 6A:
FIGS. 6A to 6F are process sectional views schematically illustrating processes for forming an electrode layer including an electrode sub active material layer and a sub current collecting layer.
Figure 6B:
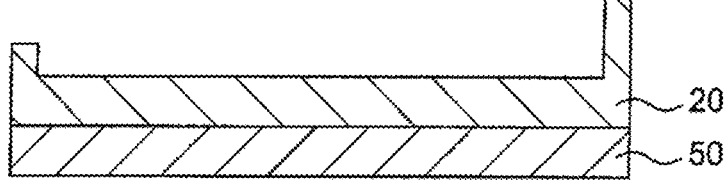
Figure 6C:
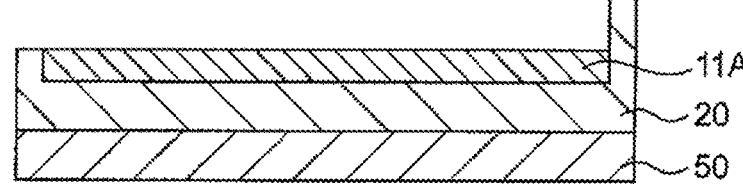
Figure 6D:
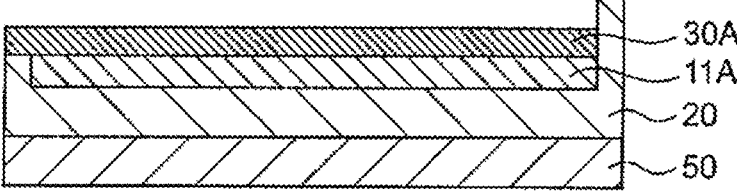
Figure 6E:
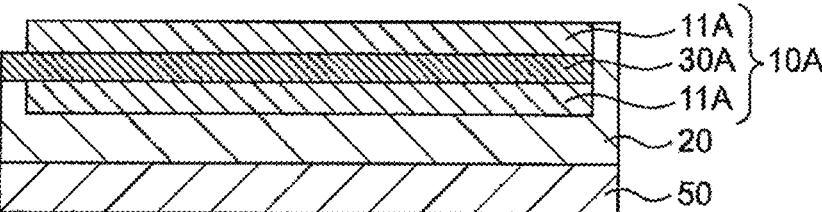
Figure 6F:
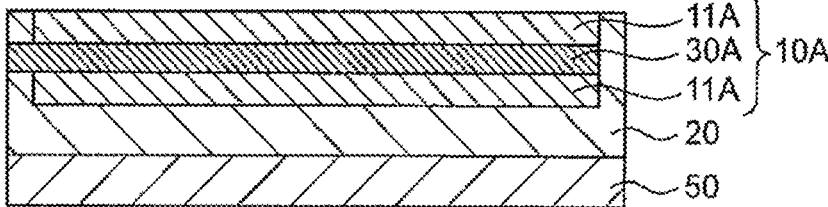

Finally, the solid electrolyte paste or the insulating material paste is applied to the recessed portion (that is, on the surface of the positive electrode sub current collecting layer 30A) at the end portion (see FIG. 6F). In this way, a positive electrode green sheet in which the positive electrode layer 10A including the positive electrode sub active material layer 11A and the positive electrode sub current collecting layer 30A and the solid electrolyte 20 (and the insulating portion) are formed is obtained.

(Formation of Negative Electrode Green Sheet)

First, the solid electrolyte 20 is formed on one surface of a base 50 by the procedure described above (see FIG. 7A). By applying the solid electrolyte paste or the insulating material paste to one end of the surface of the solid electrolyte 20 by adjusting the mesh diameter of the screen printing plate, the solid electrolyte 20 (or insulating portion) having a recessed portion whose thickness gradually increases toward the edge is formed (see FIG. 7B).

Next, a negative electrode active material layer paste is prepared by mixing a negative electrode active material, a solvent, and, if necessary, a negative electrode active material binder and the like with each other. Subsequently, by using a pattern forming method, the negative electrode active material layer paste is applied to the recessed portion of the solid electrolyte 20 by adjusting the mesh diameter of the screen printing plate, whereby a negative electrode layer 10B whose thickness is gradually thinner toward the edge is formed (see FIG. 7C).

Figure 7A:
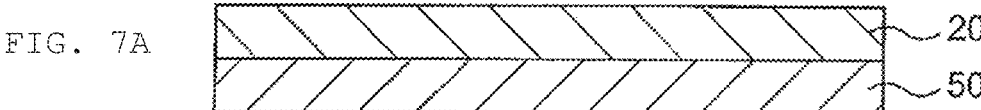
FIGS. 7A to 7D are process sectional views schematically illustrating processes for forming an electrode layer in which a thickness of an end portion is smaller than a thickness of a central portion.
Figure 7B:
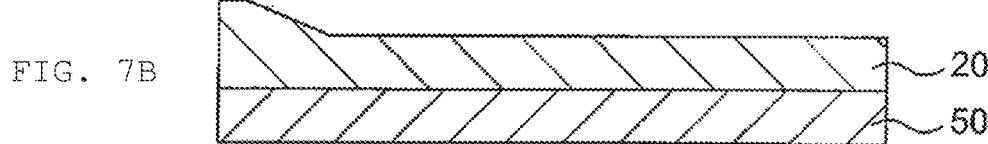
Figure 7C:
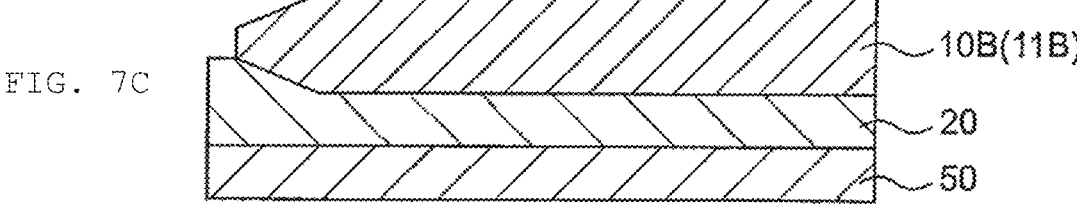
Figure 7D:
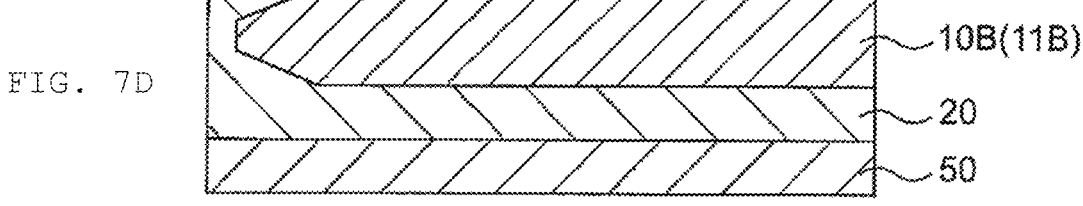

Finally, the solid electrolyte paste or the insulating material paste is applied so as to fill the side of the negative electrode layer 10B, to form the solid electrolyte 20 (or the insulating portion) (see FIG. 7D). In this way, a negative electrode green sheet in which the negative electrode layer 10B and the solid electrolyte 20 (and the insulating portion) are formed is obtained. Here, one end portion (that is, the non-terminal contact end portion) of the negative electrode layer 10B has a shape tapered from both sides in the electrode laminated direction toward the edge of the electrode layer.

(Formation of Solid-State Battery Laminated Body)

First, the negative electrode green sheet and the positive electrode green sheet peeled from the base are alternately stacked in layers in this order. Here, for example, three negative electrode green sheets and two positive electrode green sheets are alternately stacked in layers.

Next, a solid electrolyte is formed on the negative electrode green sheets stacked in layers by the same procedure as the procedure for forming the solid electrolyte. In this way, a solid-state battery laminated body precursor is formed.

Finally, the solid-state battery laminated body precursor is heated. At the time of heating, a heating temperature is set such that a series of layers constituting the solid-state battery laminated body precursor is sintered. Other conditions such as heating time may be arbitrarily set.

Because a series of layers constituting the solid-state battery laminated body precursor is sintered by the heat treatment, the series of layers is thermo pressure-bonded. Therefore, a solid-state battery laminated body is formed.

(Formation of External Terminal)

A positive electrode terminal is bonded to the solid-state battery laminated body using a conductive adhesive, and a negative electrode terminal is bonded to the solid-state battery laminated body using a conductive adhesive. As a result, each of the positive electrode terminal and the negative electrode terminal is attached to the solid-state battery laminated body, and thus a solid-state battery is completed.

EXAMPLES

To confirm the effect of the present invention, solid-state battery samples were prepared and evaluated as follows.

[Preparation of Solid-State Battery Sample]

First, a solid-state battery sample was prepared by the procedure described below.

(Formation of Positive Electrode Green Sheet)

First, a solid electrolyte paste was prepared by mixing a solid electrolyte (oxide glass $60Li_2O\text{-}10SiO_2\text{-}30B_2O_3$), an electrolyte binder (acrylic resin), and a solvent (butyl acetate) each other, and then agitating (agitation time: 4 hours) the mixture using zirconia balls (diameter: 5 mm). At this time, the mixing ratio (weight ratio) of the solid electrolyte and the electrolyte binder was set to 70:30, and the concentration of the solid content in the mixture was set to 30 wt %.

The obtained solid electrolyte paste was applied onto a base coated with a release agent (PET film: Toray Industries, Inc.), and then the electrolyte paste was dried at 80° C., whereby a solid electrolyte green sheet was formed.

Next, a positive electrode active material layer paste was prepared by agitating lithium cobalt oxide ($LiCoO_2$) as a positive electrode active material, oxide glass ($60Li_2O\text{-}10SiO_2\text{-}30B_2O_3$) as a solid electrolyte, an acrylic resin as a positive electrode binder, and terpineol as a solvent for 1 hour using an agitator. The ratio of each material was set to active material: solid electrolyte: binder=70:20:10 (weight %), and the solid content concentration was set to 60%.

A current collecting layer paste was prepared by agitating a carbon material as a conductive material, oxide glass ($60Li_2O\text{-}10SiO_2\text{-}30B_2O_3$) as a solid electrolyte, an acrylic resin as a positive electrode binder, and terpineol as a solvent for 1 hour using an agitator. The ratio of each material was conductive material: solid electrolyte: binder=70:20:10 (weight %), and the solid content concentration was 60%.

An insulating material paste was prepared by agitating alumina ($Al_2O_3$) as an insulating material, oxide glass ($60Li_2O\text{-}10SiO_2\text{-}30B_2O_3$) as a solid electrolyte, an acrylic resin as a negative electrode binder, and terpineol as a solvent for 1 hour using an agitator. The ratio of each material was set to insulating material: solid electrolyte: binder=70:20:10 (weight %), and the solid content concentration was set to 60%.

Next, the positive electrode active material layer paste was applied onto the solid electrolyte green sheet by a screen printing method, and then dried at 80° C. to form a positive electrode sub active material layer on the green sheet. Further, the insulating material paste, the current collecting layer paste, and the positive electrode active material layer paste were applied by a screen printing method, and then dried at 80° C. At this time, the insulating material paste was applied such that an insulating portion was interposed between the positive electrode layer (that is, the positive electrode sub active material layer and the positive electrode sub current collecting layer) and the surface on which the positive electrode terminal was to be formed. Whereby, a positive electrode green sheet in which a positive electrode layer including a positive electrode sub active material layer and a positive electrode sub current collecting layer, a solid electrolyte, and an insulating material were formed was obtained.

(Formation of Negative Electrode Green Sheet)

A negative electrode active material layer paste was prepared by agitating graphite as a negative electrode active material, oxide glass ($60Li_2O\text{-}10SiO_2\text{-}30B_2O_3$) as a solid electrolyte, an acrylic resin as a negative electrode binder, and terpineol as a solvent for 1 hour using an agitator. The ratio of each material was set to active material: solid electrolyte: binder=70:20:10 (weight %), and the solid content concentration was set to 60%.

Next, the negative electrode active material layer paste prepared by the above-described method was applied onto the solid electrolyte green sheet by a screen printing method, and then dried at 80° C. to form a negative electrode sub active material layer on the green sheet. Further, the insulating material paste was applied by a screen printing method, and then dried at 80° C. At this time, the insulating material paste was applied such that an insulating portion was interposed between the negative electrode layer (that is, the negative electrode sub active material layer) and the surface on which the negative electrode terminal was to be formed. Whereby, a negative electrode green sheet on which the negative electrode sub active material layer, the solid electrolyte, and the insulating material were formed was obtained.

(Formation of Solid-State Battery Laminated Body)

After stacking a plurality of solid electrolyte green sheets in layers, 13 negative electrode green sheets and 12 positive electrode green sheets produced by the above-described method were alternately stacked in layers (total 24 layers), and a plurality of solid electrolyte green sheets were further stacked thereon. Then, the obtained material was heated to 100° C. while applying a pressure in the thickness direction to obtain a solid-state battery laminated body in which each green sheet was pressure-bonded.

Subsequently, the organic material was removed by heating at 300° C. for 10 hours in a nitrogen gas atmosphere containing oxygen gas, and then the laminated body was heated at 350° C. for 10 minutes while a pressure was applied in the thickness direction. Thereafter, cooling was performed to obtain a sintered solid-state battery laminated body.

(Formation of External Terminal)

A positive electrode terminal was bonded to the solid-state battery laminated body using a conductive adhesive (thermosetting silver paste), and a negative electrode terminal was bonded to the solid laminated body using the same conductive adhesive. Whereby, a solid-state battery sample in which each of the positive electrode terminal and the negative electrode terminal was attached to the solid-state battery laminated body was obtained.

Examples 1 to 7

The solid-state battery samples in Examples were prepared according to the steps of forming respective constituent members described above. That is, the solid-state battery samples in Examples are solid-state battery samples having a configuration in which the positive electrode layer includes a positive electrode sub active material layer and a sub current collecting layer, and the negative electrode layer includes only a negative electrode sub active material layer (see FIG. 2).

In the solid-state battery samples in Examples, the mesh diameter of the screen printing plate was adjusted such that the thickness of the non-terminal contact end portion $10B_2$ is smaller than the thickness of the central portion of the negative electrode layer $10B$ in the b-b' cross section of FIG. 1, and seven samples having negative electrode layers $10B$ having different thicknesses of the non-terminal contact end portion $10B_2$ were prepared (see FIG. 2). Specifically, at the non-terminal contact end portion $10B_2$, the mesh diameter of the screen printing plate was adjusted such that the ratio of the thickness $(T_2)$ at a position of 100 μm from the edge of the negative electrode layer to the thickness $(T_1)$ of the central portion of the negative electrode layer was no more than 0.95, and the ratio of the thickness $(T_3)$ at a position of 10 μm from the edge of the negative electrode layer to the thickness $(T_1)$ of the central portion of the negative electrode layer was no more than 0.50.

Comparative Examples 1 to 3

Three solid-state battery samples were prepared in the same manner as the solid-state battery samples in Examples except that the negative electrode layer includes a negative electrode sub active material layer and a negative electrode sub current collecting layer. The negative electrode layer was prepared by changing the positive electrode active material layer paste to the negative electrode active material layer paste based on the method for forming a positive electrode green sheet. The positive electrode green sheet and the negative electrode green sheet were prepared with a screen printing plate having a uniform mesh diameter.

[Evaluation of Solid-State Battery]

(Measurement of Electrode Layer Thickness)

A section of each solid-state battery sample was cut out with an ion milling apparatus, and the surface was adjusted by polishing, thereby exposing a section (b-b' section in FIG. 1) in a sectional view of the solid-state battery. The section was observed by FE-SEM, and the electrode length of the negative electrode layer in each sample was measured.

Next, based on the obtained length of the negative electrode layer, the thickness of the central portion of the negative electrode layer (positions of two points in the range of no less than 200 μm and no more than 1 mm from the edge of the negative electrode layer) and the end portion of the negative electrode layer (position of 100 μm from the edge of the negative electrode layer and position of 10 μm from the edge) was measured. For each of the obtained thicknesses, the thickness obtained by averaging the thicknesses at two points in the central portion of the negative electrode layer was defined as Ti, the thickness at a position of 100 μm from the edge of the negative electrode layer was defined as $T_2$, and the thickness at a position of 10 μm from the edge of the negative electrode layer was defined as $T_3$. The ratios of the thicknesses $T_2$ and $T_3$ of the end portions to the thickness $T_1$ of the central portion of the negative electrode layer were calculated as electrode thickness ratios $T_2/T_1$ and $T_3/T_1$.

(Crack Test in Charge and Discharge)

For each solid-state battery sample obtained as described above, an external terminal was connected with a lead wire for energization. First, each sample was charged at a current of 0.1C until the voltage reached 4.2V, and then charged at a voltage of 4.2V until the current reached 0.01C. Next, the battery was discharged at a current of 0.1C until the voltage reached 2.0V. The discharge capacity obtained at this time was taken as the battery capacity of each sample. Here, the ratio of the battery capacity of each sample to the battery capacity of the sample of Comparative Example 1 was calculated as a battery capacity ratio. In addition, based on the battery capacity of each sample, 50 cycles of charge and discharge were performed with the above-described charge and discharge condition as 1 cycle.

For each sample after the charge-discharge cycles, the presence or absence of cracks in the negative electrode layer was checked by X-ray CT and polishing. The presence or absence of cracks was measured as the number of cracks detected (the number of cells in which cracks occurred/the total number of test cells).

Figure 8A:
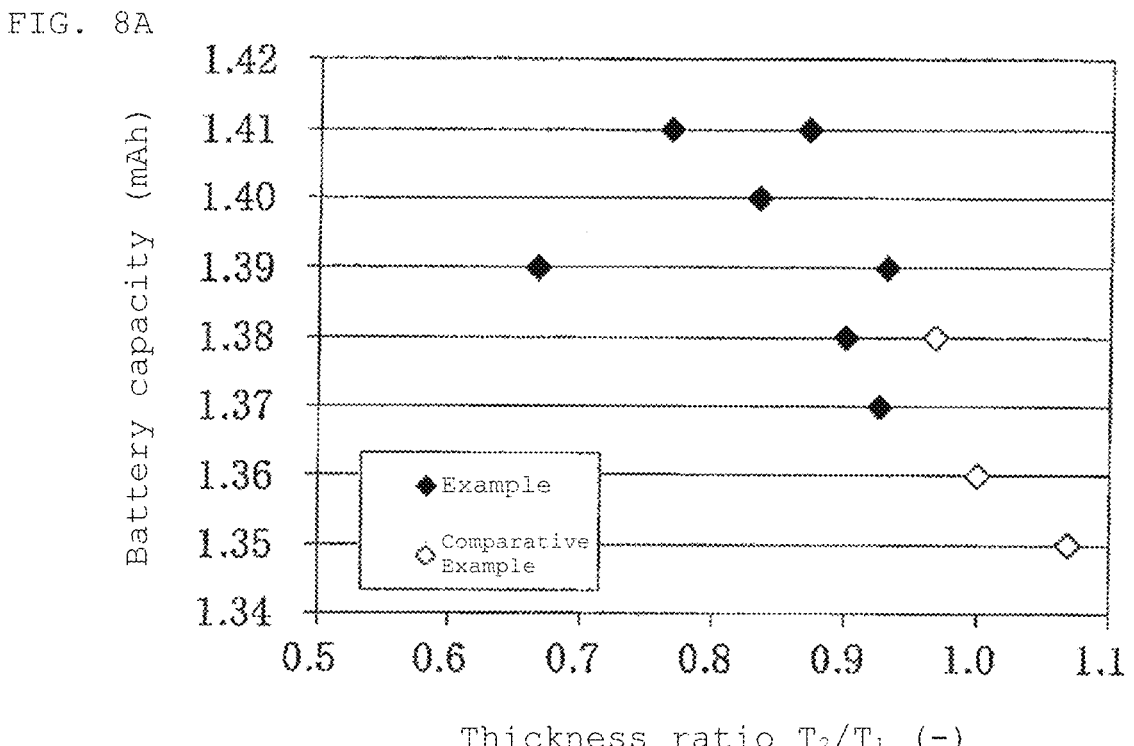
FIGS. 8A and 8B are graphs showing results of Examples (graphs showing a correlation between a battery capacity and a thickness ratio between a central portion and an end portion of an electrode layer).
Figure 8B:
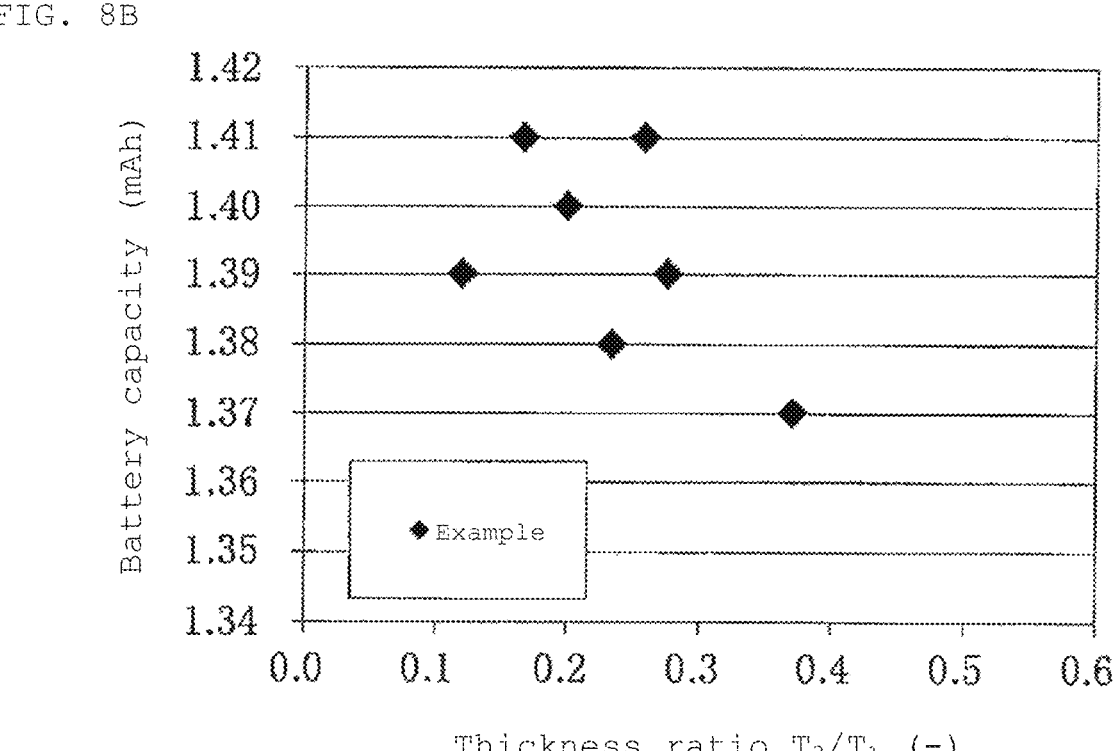

Table 1 shows the results of performing the crack test in charge and discharge on the Example samples and the Comparative Example samples. The correlation between the battery capacity ratio and the electrode layer thickness ratio of each sample is shown in FIGS. 8(A) and 8(B).

TABLE 1

| | Battery capacity ratio (%) | Electrode layer thickness ratio (—) | | Number of cracks detected |
| --- | --- | --- | --- | --- |
| | | $T_2/T_1$ | $T_3/T_1$ | |
| Example 1 | 101.4 | 0.83 | 0.20 | 0/30 |
| Example 2 | 102.2 | 0.87 | 0.26 | 0/30 |
| Example 3 | 100.7 | 0.93 | 0.28 | 0/30 |
| Example 4 | 102.2 | 0.77 | 0.17 | 0/30 |
| Example 5 | 99.3 | 0.93 | 0.37 | 0/30 |
| Example 6 | 100.0 | 0.90 | 0.23 | 0/30 |
| Example 7 | 100.7 | 0.67 | 0.12 | 0/30 |
| Comparative Example 1 | 100.0 | 0.97 | 0.97 | 10/30 |
| Comparative Example 2 | 97.8 | 1.07 | 1.03 | 8/30 |
| Comparative Example 3 | 97.1 | 1.00 | 0.97 | 7/30 |

As shown in Table 1, in Examples, no cracks were observed in the electrode layer in any of the samples. On the other hand, in Comparative Examples, cracks were generated in the electrode layer in all the samples. Therefore, it was found that in the solid-state battery of the present invention, the occurrence of cracks in the electrode layer in charge-discharge cycle can be suitably suppressed.

In addition, the battery capacity of the Example samples was larger than the battery capacity of the Comparative Example samples. This is considered to be because, in the Example samples, the negative electrode sub active material layer was configured to be in direct contact with the external terminal, and thus a sufficient amount of active material was able to be secured, and/or the balance of ion conduction inside the solid-state battery was able to be improved by the shape of the non-terminal contact end portion. Therefore, it was found that in the solid-state battery of the present invention, the battery capacity can be at least maintained or improved.

Although the embodiments of the present invention have been described above, only typical examples have been illustrated. Therefore, those skilled in the art will easily understand that the present invention is not limited thereto, and various embodiments are conceivable without changing the gist of the present invention.

For example, in the above description, the solid-state battery exemplified in FIG. 2 and the like has been mainly described, but the present invention is not necessarily limited thereto. In the present invention, any solid-state battery can be applied in the same way as long as it includes a positive electrode layer, a negative electrode layer, and a solid electrolyte, wherein at least one electrode layer has a terminal contact end portion containing an electrode active material and a non-terminal contact end portion whose thickness is smaller than the thickness of the central portion of the electrode layer.

The solid-state battery of the present invention may be used in various fields where power storage is assumed. Although it is merely an example, the solid-state battery of the present invention may be used in the fields of electricity, information, and communication in which electricity, electronic equipment, and the like are used (for example, electric and electronic equipment fields or mobile equipment fields including mobile phones, smartphones, notebook computers and digital cameras, activity meters, arm computers, electronic paper, RFID tags, card-type electronic money, and small electronic machines such as smartwatches), home and small industrial applications (for example, the fields of electric tools, golf carts, and home, nursing, and industrial robots), large industrial applications (for example, fields of forklift, elevator, and harbor crane), transportation system fields (for example, the field of hybrid vehicles, electric vehicles, buses, trains, power-assisted bicycles, electric two-wheeled vehicles, and the like), power system applications (for example, fields such as various types of power generation, road conditioners, smart grids, and household power storage systems), medical applications (medical equipment fields such as hearing aid earbuds), pharmaceutical applications (fields such as dosage management systems), IoT fields, space and deep sea applications (for example, fields such as a space probe and a submersible), and the like.

DESCRIPTION OF REFERENCE SYMBOLS

10: Electrode layer
10$_E$: Edge of electrode layer
10A: Positive electrode layer
10A$_1$: Terminal contact end portion of positive electrode layer
10A$_2$: Non-terminal contact end portion of positive electrode layer
10B: Negative electrode layer
10B$_1$: Terminal contact end portion of negative electrode layer
10B$_2$: Non-terminal contact end portion of negative electrode layer
10B$_E$: Edge of negative electrode layer
11: Electrode sub active material layer
11A: Positive electrode sub active material layer
11B: Negative electrode sub active material layer
20: Solid electrolyte
20I: Insulating portion
30: Sub current collecting layer
30A: Positive electrode sub current collecting layer
30B: Negative electrode sub current collecting layer
40: Terminal
40A: Positive electrode terminal
40B: Negative electrode terminal
50: Base
500': Solid-state battery laminated body
500'A: Positive-electrode-side end surface
500'B: Negative-electrode-side end surface
500: Solid-state battery

The invention claimed is:

1. A solid-state battery comprising:
a solid-state battery laminated body including a positive electrode layer, a negative electrode layer, and a solid electrolyte interposed between the positive electrode layer and the negative electrode layer, and wherein the solid-state battery laminated body is an integrally sintered body;
a positive electrode terminal on a first side surface of the solid-state battery laminated body; and
a negative electrode terminal on a second side surface of the solid-state battery laminated body, the second side surface facing the first side surface,
wherein, at least one of:
(1) the positive electrode layer has a terminal contact end portion containing a positive electrode active material in direct contact with the positive electrode terminal, a thickness of a non-terminal contact end portion of the positive electrode layer is smaller than a thickness of a central portion of the positive electrode layer, and an insulating material is between the non-terminal contact end portion of the positive electrode layer and the negative electrode terminal, and (2) the negative electrode layer has a terminal contact end portion containing a negative electrode active material in direct contact with the negative electrode terminal, and a thickness of a non-terminal contact end portion in the negative electrode layer is smaller than a thickness of a central portion of the negative electrode layer, and an insulating material is between the non-terminal contact end portion of the negative electrode layer and the positive electrode terminal.

2. The solid-state battery according to claim 1, wherein at least one of (1) the thickness of the non-terminal contact end portion in the positive electrode layer gradually decreases toward an edge of the positive electrode layer in a sectional view of the solid-state battery, and (2) the thickness of the non-terminal contact end portion in the negative electrode layer gradually decreases toward an edge of the negative electrode layer in a sectional view of the solid-state battery.

3. The solid-state battery according to claim 1, wherein at least one of (1) the non-terminal contact end portion of the positive electrode layer has a shape tapered from both sides thereof in an electrode laminated direction toward an edge of the positive electrode layer at the non-terminal contact end portion in a sectional view of the solid-state battery, and (2) the non-terminal contact end portion of the negative electrode layer has a shape tapered from both sides thereof in the electrode laminated direction toward an edge of the negative electrode layer at the non-terminal contact end portion in a sectional view of the solid-state battery.

4. The solid-state battery according to claim 1, wherein at least one of (1) in the positive electrode layer, a ratio of the thickness of the non-terminal contact end portion to the thickness of the central portion of the positive electrode layer is 0.5 to 0.95 at a position of 100 μm from an edge of the positive electrode layer in the non-terminal contact end portion, and 0.05 to 0.5 at a position of 10 μm from the edge of the positive electrode layer, and (2) in the negative electrode layer, a ratio of the thickness of the non-terminal contact end portion to the thickness of the central portion of the negative electrode layer is 0.5 to 0.95 at a position of 100 μm from an edge of the negative electrode layer in the non-terminal contact end portion, and 0.05 to 0.5 at a position of 10 μm from the edge of the negative electrode layer.

5. The solid-state battery according to claim 1, wherein at least one of (1) a thickness of the terminal contact end portion in the positive electrode layer is smaller than the thickness of the central portion of the positive electrode layer, and (2) a thickness of the terminal contact end portion in the negative electrode layer is smaller than the thickness of the central portion of the negative electrode layer.

6. The solid-state battery according to claim 5, wherein at least one of (1) the terminal contact end portion of the positive electrode layer has a shape tapered from both sides in an electrode laminated direction toward an edge of the positive electrode layer at the terminal contact end in a sectional view of the solid-state battery, and (2) the terminal contact end portion of the negative electrode layer has a shape tapered from both sides in the electrode laminated direction toward an edge of the negative electrode layer at the terminal contact end in a sectional view of the solid-state battery.

7. The solid-state battery according to claim 5, wherein at least one of (1) in the positive electrode layer, a ratio of the thickness of the terminal contact end portion to the thickness of the central portion of the positive electrode layer is 0.5 to 0.95 at a position of 100 μm from an edge of the positive electrode layer at the terminal contact end portion, and 0.05 to 0.5 at a position of 10 μm from the edge of the positive electrode layer, and (2) in the negative electrode layer, a ratio of the thickness of the terminal contact end portion to the thickness of the central portion of the negative electrode layer is 0.5 to 0.95 at a position of 100 μm from an edge of the negative electrode layer at the terminal contact end portion, and 0.05 to 0.5 at a position of 10 μm from the edge of the negative electrode layer.

8. The solid-state battery according to claim 1, wherein at least one of (1) both the terminal contact end portion and the non-terminal contact end portion of the positive electrode layer have a shape gradually tapered in a sectional view of the solid-state battery, and (2) both the terminal contact end portion and the non-terminal contact end portion of the negative electrode layer have a shape gradually tapered in a sectional view of the solid-state battery.

9. The solid-state battery according to claim 1, wherein at least one of (1) the positive electrode layer has a current collecting layer-less structure, and (2) the negative electrode layer has a current collecting layer-less structure.

10. The solid-state battery according to claim 1, wherein both:

(1) the positive electrode layer has a terminal contact end portion containing a positive electrode active material in direct contact with the positive electrode terminal, a thickness of a non-terminal contact end portion of the positive electrode layer is smaller than a thickness of a central portion of the positive electrode layer, and (2) the negative electrode layer has a terminal contact end portion containing a negative electrode active material in direct contact with the negative electrode terminal, and a thickness of a non-terminal contact end portion in the negative electrode layer is smaller than a thickness of a central portion of the negative electrode layer.

11. The solid-state battery according to claim 10, wherein both (1) the thickness of the non-terminal contact end portion in the positive electrode layer gradually decreases toward an edge of the positive electrode layer in a sectional view of the solid-state battery, and (2) the thickness of the non-terminal contact end portion in the negative electrode layer gradually decreases toward an edge of the negative electrode layer in a sectional view of the solid-state battery.

12. The solid-state battery according to claim 10, wherein both (1) the non-terminal contact end portion of the positive electrode layer has a shape tapered from both sides thereof in an electrode laminated direction toward an edge of the positive electrode layer at the non-terminal contact end portion in a sectional view of the solid-state battery, and (2) the non-terminal contact end portion of the negative electrode layer has a shape tapered from both sides thereof in the electrode laminated direction toward an edge of the negative electrode layer at the non-terminal contact end portion in a sectional view of the solid-state battery.

13. The solid-state battery according to claim 10, wherein both (1) in the positive electrode layer, a ratio of the thickness of the non-terminal contact end portion to the thickness of the central portion of the positive electrode layer is 0.5 to 0.95 at a position of 100 μm from an edge of the positive electrode layer in the non-terminal contact end portion, and 0.05 to 0.5 at a position of 10 μm from the edge of the positive electrode layer, and (2) in the negative electrode layer, a ratio of the thickness of the non-terminal contact end portion to the thickness of the central portion of the negative electrode layer is 0.5 to 0.95 at a position of 100

μm from an edge of the negative electrode layer in the non-terminal contact end portion, and 0.05 to 0.5 at a position of 10 μm from the edge of the negative electrode layer.

14. The solid-state battery according to claim 10, wherein both (1) a thickness of the terminal contact end portion in the positive electrode layer is smaller than the thickness of the central portion of the positive electrode layer, and (2) a thickness of the terminal contact end portion in the negative electrode layer is smaller than the thickness of the central portion of the negative electrode layer.

15. The solid-state battery according to claim 14, wherein both (1) the terminal contact end portion of the positive electrode layer has a shape tapered from both sides in an electrode laminated direction toward an edge of the positive electrode layer at the terminal contact end in a sectional view of the solid-state battery, and (2) the terminal contact end portion of the negative electrode layer has a shape tapered from both sides in the electrode laminated direction toward an edge of the negative electrode layer at the terminal contact end in a sectional view of the solid-state battery.

16. The solid-state battery according to claim 14, wherein both (1) in the positive electrode layer, a ratio of the thickness of the terminal contact end portion to the thickness of the central portion of the positive electrode layer is 0.5 to 0.95 at a position of 100 μm from an edge of the positive electrode layer at the terminal contact end portion, and 0.05 to 0.5 at a position of 10 μm from the edge of the positive electrode layer, and (2) in the negative electrode layer, a ratio of the thickness of the terminal contact end portion to the thickness of the central portion of the negative electrode layer is 0.5 to 0.95 at a position of 100 μm from an edge of the negative electrode layer at the terminal contact end portion, and 0.05 to 0.5 at a position of 10 μm from the edge of the negative electrode layer.

17. The solid-state battery according to claim 10, wherein both (1) both the terminal contact end portion and the non-terminal contact end portion of the positive electrode layer have a shape gradually tapered in a sectional view of the solid-state battery, and (2) both the terminal contact end portion and the non-terminal contact end portion of the negative electrode layer have a shape gradually tapered in a sectional view of the solid-state battery.

18. The solid-state battery according to claim 10, wherein both (1) the positive electrode layer has a current collecting layer-less structure, and (2) the negative electrode layer has a current collecting layer-less structure.

19. The solid-state battery according to claim 1, wherein the positive electrode layer and the negative electrode layer are layers capable of occluding and releasing lithium ions.

20. The solid-state battery according to claim 1, wherein the negative electrode layer contains at least one selected from graphite, a lithium alloy, and a lithium-containing compound.

21. The solid-state battery according to claim 1, wherein the electrode active material at the terminal contact end portion of either the positive electrode layer or the negative electrode layer does not face the electrode active material of an adjacent electrode layer of opposite polarity at the non-terminal contact end portion thereof in the stacking direction.

* * * * *